(12) United States Patent
Thein et al.

(10) Patent No.: US 9,565,047 B2
(45) Date of Patent: Feb. 7, 2017

(54) FILTERBANK-BASED MULTICARRIER TRANSMITTER FOR TRANSMITTING A MULTICARRIER SIGNAL

(71) Applicant: Huawei Technologies Co., Ltd., Shenzhen, Guangdong (CN)

(72) Inventors: Christoph Thein, Hannover (DE); Martin Fuhrwerk, Hannover (DE); Jurgen Peissig, Hannover (DE); Malte Schellmann, Munich (DE); Zhao Zhao, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/966,906

(22) Filed: Dec. 11, 2015

(65) Prior Publication Data
US 2016/0099822 A1   Apr. 7, 2016

Related U.S. Application Data

(63) Continuation of application No. PCT/EP2013/062442, filed on Jun. 14, 2013.

(51) Int. Cl.
*H04L 27/28* (2006.01)
*H04L 27/26* (2006.01)
*H04L 5/00* (2006.01)

(52) U.S. Cl.
CPC ........... *H04L 27/264* (2013.01); *H04L 5/0051* (2013.01); *H04L 27/2659* (2013.01); (Continued)

(58) Field of Classification Search
CPC .............. H04L 27/264; H04L 27/2601; H04L 27/2631; H04L 27/2676; H04L 27/2675; H04L 27/26; H04J 14/0298; H04W 56/00
See application file for complete search history.

(56) References Cited

U.S. PATENT DOCUMENTS 7,852,954 B2 * 12/2010 Ihm .................. H04B 7/0417
                                                     375/259
2007/0263734 A1 * 11/2007 Seki .................. H04L 1/0006
                                                     375/259

(Continued)

OTHER PUBLICATIONS

Marco Moretti, et al., "OFDM synchronization in an uncoordinated spectrum sharing scenario", IEEE, 2007, p. 3796-3801.

(Continued)

*Primary Examiner* — Khanh C Tran

(57) ABSTRACT

A filterbank-based multicarrier transmitter for transmitting a multicarrier signal is disclosed, the multicarrier signal comprising a synchronization part and a payload part, the synchronization part comprising K1 frequency sub-channels being arranged to form M subsequent multicarrier symbols, the payload part comprising K2 frequency sub-channels, the filterbank-based multicarrier transmitter comprising a processor being configured to assign subsequent pilot values of a pilot sequence to every $P^{th}$ frequency sub-channel of the K1 frequency sub-channels to obtain a pilot symbol of the multicarrier signal, and to assign subsequent payload values of a payload sequence to subsequent frequency sub-channels of the K2 frequency sub-channels to obtain a payload symbol of the multicarrier signal, and wherein the processor is configured to assign subsequent groups of subsequent pilot values to every $Q^{th}$ symbol of the M multicarrier symbols.

14 Claims, 9 Drawing Sheets

(52) U.S. Cl.
CPC ...... *H04L 27/2672* (2013.01); *H04L 27/2675* (2013.01); *H04L 27/2692* (2013.01)

(56) References Cited

U.S. PATENT DOCUMENTS

| | | | |
|---|---|---|---|
| 2008/0137718 A1* | 6/2008 | Cha | H04L 1/0041 375/146 |
| 2009/0247172 A1* | 10/2009 | Palanki | H04J 11/0069 455/447 |
| 2010/0124292 A1* | 5/2010 | Rajagopal | H04L 5/0048 375/260 |
| 2012/0243625 A1 | 9/2012 | Berg | |
| 2015/0124911 A1* | 5/2015 | Wicker, Jr. | H04L 25/0242 375/340 |

OTHER PUBLICATIONS

Tilde Fusco, et al., "Data-Aided Symbol Timing and CFO Synchronization for Filter Bank Multicarrier Systems", IEEE Transactions on Wireless Communications, vol. 8, No. 5, May 2009, p. 2705-2715.

Daryl Leon Wasden, et al., "Design and Implementation of an Underlay Control Channel for Cognitive Radios", IEEE Journal on Selected Areas in Communications, vol. 30, No. 10, Nov. 2012, p. 1875-1889.

Tobias Hidalgo Stitz, et al., "Pilot-Based Synchronization and Equalization in Filter Bank Multicarrier Communications", EURASIP Journal on Advances in Signal Processing, vol. 2010, Jun. 16, 2009, 18 pages.

Tobias Hidalgo Stitz, et al., "CFO estimation and correction in a WiMAX-like FBMC system", Signal Processing Advances in Wireless Communications, Jun. 21, 2009, p. 633-637.

Christoph Thein, et al., "Frequency-Domain Processing for Synchronization and Channel Estimation in OQAM-OFDM Systems", 2013 IEEE 14th Workshop on Signal Processing Advances in Wireless Communications, Jun. 16, 2013, p. 634-638.

Bruno Jahan, et al., "Full synchronization method for OFDM/OQAM and OFDM/QAM modulations", Spread Spectrum Techniques and Applications, Aug. 25, 2008, p. 344-348.

Tobias Hidalgo Stitz, et al., "Practical Issues in Frequency Domain Synchronization for Filter Bank Based Multicarrier Transmission", ISCCSP 2008, Mar. 12-14, 2008, p. 411-416.

* cited by examiner

FILTERBANK-BASED MULTICARRIER TRANSMITTER FOR TRANSMITTING A MULTICARRIER SIGNAL

CROSS-REFERENCE TO RELATED APPLICATIONS

This application is a continuation of International Application No. PCT/EP2013/062442, filed on Jun. 14, 2013, which is hereby incorporated by reference in its entirety.

TECHNICAL FIELD

The invention relates to the field of communication technology, and more particularly to filterbank-based multicarrier transmitters.

BACKGROUND

Filterbank-based multicarrier (FBMC) communication systems are of increasing interest in the context of dynamic or shared spectrum access and inter-operator sharing. In these contexts, different communication systems can coexist in the same frequency band and an exclusive and contiguous usage of the frequency band for one communication system may not be realizable. Therefore, the receiver has to cope with interference from different users within its allocated frequency band and has to deal with a fragmented frequency spectrum.

Synchronization schemes for filterbank-based multicarrier systems are usually performed in the time-domain, where it is assumed that the multicarrier signals cover a contiguous bandwidth with no interfering signals.

However, time-domain based synchronization schemes suffer from several drawbacks. Time-domain based synchronization schemes may fail to synchronize if other users or interfering signals exhibit higher signal power than expected at the receiver. Furthermore, additional pre-filtering techniques of the time-domain signal may come at high implementation costs and may lead to distortion of the signals. Moreover, time-domain based synchronization schemes may be based on a large number of pilot symbols which may lead to a penalty in spectral efficiency of the communication system. Finally, implementation costs for time-domain based synchronization schemes may scale linearly with the number of users.

Synchronization schemes for filterbank-based multicarrier systems can also be performed in the frequency-domain.

In T. H. Stitz, T. Ihalainen, A. Viholainen, M. Renfors, "Pilot-Based Synchronization and Equalization in Filter Bank Multicarrier Communications," EURASIP Journal on Advances in Signal Processing, vol. 2010, pp. 1-19, 2010, a pilot-based synchronization scheme in frequency-domain is presented. The presented synchronization scheme is based on a fixed pilot symbol arrangement of legacy systems. Furthermore, the presented synchronization scheme assumes coarsely pre-synchronization and suffers from a limited offset estimation range.

In T. H. Stitz, T. Ihalainen, M. Renfors, "Practical issues in frequency domain synchronization for filter bank based multicarrier transmission," Communications, Control and Signal Processing, 2008, ISCCSP 2008, 3rd International Symposium, 2008, pp. 411-416, a preamble-based synchronization scheme in oversampled filterbank-based multicarrier systems is presented. The presented synchronization scheme is based on a long pilot symbol arrangement with boosted signal power and suffers from a limited offset estimation range.

SUMMARY

It is the object of the embodiments of the invention to provide an efficient frequency-domain based synchronization scheme for filterbank-based multicarrier communication systems.

This object is achieved by the features of the independent claims. Further implementation forms are apparent from the dependent claims, the description and the figures.

The embodiments of the invention are based on the finding, that an improved assignment of pilot values in a synchronization part of a multicarrier signal can be utilized.

According to a first aspect, the embodiment of the invention relates to a filterbank-based multicarrier transmitter for transmitting a multicarrier signal, the multicarrier signal comprising a synchronization part and a payload part, the synchronization part comprising K1 frequency sub-channels, the payload part comprising K2 frequency sub-channels, the K1 frequency sub-channels of the synchronization part being arranged to form M subsequent multicarrier symbols, the filterbank-based multicarrier transmitter comprising a processor being configured to assign subsequent pilot values of a pilot sequence to every $P^{th}$ frequency sub-channel of the K1 frequency sub-channels of the synchronization part to obtain a pilot symbol of the multicarrier signal, and to assign subsequent payload values of a payload sequence to subsequent frequency sub-channels of the K2 frequency sub-channels of the payload part to obtain a payload symbol of the multicarrier signal, wherein P is greater than 1, and wherein the processor is configured to assign subsequent groups of subsequent pilot values to every $Q^{th}$ symbol of the M multicarrier symbols, wherein Q is equal to or greater than 1. Thus, an efficient frequency-domain based synchronization scheme can be realized.

The filterbank-based multicarrier (FBMC) transmitter can relate to an offset-quadrature-amplitude-modulation orthogonal-frequency-division-multiplexing (OQAM-OFDM) transmitter, a filtered-multitone (FMT) transmitter, and/or a generalized multicarrier (GMC) transmitter.

The synchronization part can be intended for allowing an efficient synchronization of a filterbank-based multicarrier receiver on a received multicarrier signal.

The payload part can be intended for carrying payload data between a filterbank-based multicarrier transmitter and a filterbank-based multicarrier receiver.

The frequency sub-channel can relate to a carrier frequency of a sub-carrier of the multicarrier signal. The number of frequency sub-channels K1 of the synchronization part can be a natural number, e.g. 8 or 256. The number of frequency sub-channels K2 of the payload part can be a natural number, e.g. 16 or 128, or zero. If K2 is equal to zero no payload is sent. The number of frequency sub-channels K1 of the synchronization part and the number of frequency sub-channels K2 of the payload part can be different. The number P can be a natural number, e.g. 2 or 3.

The multicarrier symbol can comprise a number of values for a number of frequency sub-channels within a symbol time. The number of subsequent multicarrier symbols M can be a natural number, e.g. 4 or 6. The number Q can be a natural number, e.g. 2 or 3.

The pilot sequence can comprise a number of pilot values. The pilot values can be complex numbers, e.g. 1+1j or 4-3j. For the case of OQAM the pilot values can only be real or pure imaginary numbers. The pilot symbol can comprise a number of pilot values for a number of frequency sub-channels within a symbol time.

The payload sequence can comprise a number of payload values. The payload values can be complex numbers, e.g. 1+2j or 4−2j. For the case of OQAM the payload values can only be real or pure imaginary numbers. The payload symbol can comprise a number of payload values for a number of frequency sub-channels within a symbol time.

The processor can be configured to execute a computer program.

In a first implementation form according to the first aspect, the processor is further configured to assign a group of auxiliary pilot values of an auxiliary pilot sequence to at least one $(Q+2)^{th}$ symbol of the M multicarrier symbols. Thus, interference from a payload symbol on a pilot symbol can be mitigated.

The auxiliary pilot sequence can comprise a number of auxiliary pilot values. The auxiliary pilot values can be complex numbers, e.g. 1+3j or 5−3j. For the case of OQAM the auxiliary pilot values can only be real or pure imaginary numbers.

The auxiliary pilot values can be determined upon the basis of pilot values of a pilot symbol and/or payload values of a payload symbol in order to mitigate the interference from the payload symbol on the pilot symbol.

In a second implementation form according to the first aspect as such or the first implementation form of the first aspect, the processor is further configured to assign zero values to non-assigned multicarrier symbols and/or frequency sub-channels. Thus, interference from adjacent frequency sub-channels and/or multicarrier symbols on a pilot value can be mitigated.

In a third implementation form according to the first aspect as such or any preceding implementation form of the first aspect, the synchronization part is arranged to precede the payload part, the synchronization part being a preamble of the multicarrier signal. Thus, an efficient arrangement of the synchronization part with respect to the payload part for burst-mode multicarrier signal transmission can be employed.

In a fourth implementation form according to the first aspect as such, the first implementation form of the first aspect, or the second implementation form of the first aspect, the synchronization part is arranged between two payload parts, the synchronization part being a midamble of the multicarrier signal. Thus, an efficient arrangement of the synchronization part with respect to the payload part for continuous-mode multicarrier signal transmission can be employed.

In a fifth implementation form according to the first aspect as such or any preceding implementation form of the first aspect, the filterbank-based multicarrier transmitter further comprises a communication interface being configured to transmit the multicarrier signal. Thus, the filterbank-based multicarrier transmitter can transmit the multicarrier signal in the radio frequency domain.

The communication interface can be configured to convert the multicarrier signal from baseband domain into radio frequency domain. The communication interface can comprise a digital-to-analog-converter, a filter, an amplifier, and/or an antenna for transmitting the multicarrier signal.

According to a second aspect, the embodiment of the invention relates to a filterbank-based multicarrier receiver for receiving a multicarrier signal, the received multicarrier signal comprising a synchronization part and a payload part, the synchronization part comprising K1 frequency sub-channels, the payload part comprising K2 frequency sub-channels, the K1 frequency sub-channels of the synchronization part being arranged to form M subsequent received multicarrier symbols, wherein subsequent pilot values of a pilot sequence are assigned to every $P^{th}$ frequency sub-channel of the K1 frequency sub-channels of the synchronization part to obtain a pilot symbol of the multicarrier signal, and wherein subsequent payload values of a payload sequence are assigned to subsequent frequency sub-channels of the K2 frequency sub-channels of the payload part to obtain a payload symbol of the multicarrier signal, wherein P is greater than 1, and wherein subsequent groups of subsequent pilot values are assigned to every $Q^{th}$ symbol of the M multicarrier symbols, wherein Q is equal to or greater than 1, the filterbank-based multicarrier receiver comprising a processor being configured to determine an initial symbol timing offset of the received M multicarrier symbols upon the basis of a correlation function between the received multicarrier signal and a shifted version of the received multicarrier signal by a value of Q symbols, to extract the pilot symbols of the multicarrier signal upon the basis of the determined initial symbol timing offset, to determine a carrier frequency offset of the received K1 and/or K2 frequency sub-channels upon the basis of the extracted pilot symbols of the multicarrier signal, and to correct the multicarrier signal upon the basis of the determined initial symbol timing offset and/or the determined carrier frequency offset. Thus, an efficient frequency-domain based synchronization scheme can be realized.

The synchronization may also work if the filterbank-based multicarrier receiver only utilizes a subset of frequency sub-channels.

The filterbank-based multicarrier (FBMC) receiver can relate to an offset-quadrature-amplitude-modulation orthogonal-frequency-division-multiplexing (OQAM-OFDM) receiver, a filtered-multitone (FMT) receiver, and/or a generalized multicarrier (GMC) receiver.

The synchronization part can be intended for allowing an efficient synchronization of the filterbank-based multicarrier receiver on a received multicarrier signal.

The payload part can be intended for carrying payload data between the filterbank-based multicarrier transmitter and the filterbank-based multicarrier receiver.

The frequency sub-channel can relate to a carrier frequency of a sub-carrier of the multicarrier signal. The number of frequency sub-channels K1 of the synchronization part can be a natural number, e.g. 8 or 256. The number of frequency sub-channels K2 of the payload part can be a natural number, e.g. 16 or 128, or zero. If K2 is equal to zero no payload is sent. The number of frequency sub-channels K1 of the synchronization part and the number of frequency sub-channels K2 of the payload part can be different. The number P can be a natural number, e.g. 2 or 3.

The multicarrier symbol can comprise a number of values for a number of frequency sub-channels within a symbol time. The number of subsequent multicarrier symbols M can be a natural number, e.g. 4 or 6. The number Q can be a natural number, e.g. 2 or 3.

The pilot sequence can comprise a number of pilot values. The pilot values can be complex numbers, e.g. 1+1j or 4−3j. For the case of OQAM the pilot values can only be real or pure imaginary numbers. The pilot symbol can comprise a number of pilot values for a number of frequency sub-channels within a symbol time.

The payload sequence can comprise a number of payload values. The payload values can be complex numbers, e.g. 1+2j or 4−2j. For the case of OQAM the payload values can only be real or pure imaginary numbers. The payload symbol can comprise a number of payload values for a number of frequency sub-channels within a symbol time.

The initial symbol timing offset can relate to an integer symbol timing offset between a symbol timing of the filterbank-based multicarrier receiver and a symbol timing of a received multicarrier signal.

The correlation function between the received multicarrier signal and the shifted version of the received multicarrier signal can relate to an energy measure between the received multicarrier signal and the shifted version of the received multicarrier signal.

The carrier frequency offset can relate to a frequency offset between a carrier frequency of the filterbank-based multicarrier receiver and a carrier frequency of a received multicarrier signal.

The processor can be configured to execute a computer program.

In a first implementation form according to the second aspect, the processor is configured to shift the multicarrier signal in time and/or in frequency in order to correct the multicarrier signal. Thus, an efficient correction of the multicarrier signal can be achieved.

The shift of the multicarrier signal in time and/or in frequency can be performed in time-domain and/or in frequency-domain. The shift of the multicarrier signal in time and/or in frequency can comprise a conversion of the multicarrier signal from time-domain into frequency-domain or from frequency-domain into time-domain. The shift of the multicarrier signal in time and/or in frequency can comprise a multiplication of the multicarrier signal with a complex exponential function. The shift of the multicarrier signal in time and/or in frequency can be performed by a coordinate rotation digital computer (CORDIC) procedure. The shift of the multicarrier signal in time and/or in frequency can further comprise an application of an analysis filterbank (AFB) and/or a synthesis filterbank (SFB).

In a second implementation form according to the second aspect as such or the first implementation form of the second aspect, the processor is configured to determine the initial symbol timing offset according to the following equations:

$$\zeta[m] = \frac{\left| \sum_{l \in \mathbb{L}} -Y_{l,m} Y_{l,m+2}^* \right|}{\frac{1}{2} \sum_{l \in \mathbb{L}} (|Y_{l,m}|^2 + |Y_{l,m+2}|^2)}$$

$$\hat{m} = \underset{m}{\mathrm{argmax}}(\zeta[m])$$

wherein $\zeta[m]$ denotes a correlation function of the multicarrier signal, $Y_{l,m}$ denotes values of the multicarrier signal for frequency sub-channel index l and multicarrier symbol index m, $\mathbb{L}$ denotes a subset of $\mathbb{K}$, $\mathbb{K}$ denotes a set of indices of frequency sub-channels, $\mathbb{L}$ comprises the indices of assigned frequency sub-channels, $(\cdot)^*$ denotes complex conjugation, and $\hat{m}$ denotes the determined initial symbol timing offset. Thus, the initial symbol timing offset can be determined efficiently.

In a third implementation form according to the second aspect as such, the first implementation form of the second aspect, or the second implementation form of the second aspect, the processor is configured to determine the carrier frequency offset according to the following equations:

$$\hat{f}_\Delta = \frac{1}{2\pi} \angle \left( \sum_{l \in \mathbb{L}} w_l \frac{-P_{l,2}^Y}{P_{l,1}^Y} \right)$$

$$w_l = \frac{|P_{l,1}^Y|^2 + |P_{l,2}^Y|^2}{\sum_{u \in \mathbb{L}} (|P_{u,1}^Y|^2 + |P_{u,2}^Y|^2)}$$

wherein $P_{l,1}^Y$ denotes values of a first extracted pilot symbol for frequency sub-channel index l, $P_{l,2}^Y$ denotes values of a second extracted pilot symbol for frequency sub-channel index l, $w_l$ denotes normalized weights, $\mathbb{L}$ denotes a subset of $\mathbb{K}$, $\mathbb{K}$ denotes a set of indices of frequency sub-channels, $\mathbb{L}$ comprises the indices of assigned frequency sub-channels, $\angle(\cdot)$ denotes an argument of a complex number and $\hat{f}_\Delta$ denotes the determined carrier frequency offset. Thus, the carrier frequency offset can be determined efficiently.

The first extracted pilot symbol and the second extracted pilot symbol can relate to subsequent pilot symbols of the synchronization part. The first extracted pilot symbol can be the first pilot symbol in the synchronization part. The second extracted pilot symbol can be the second pilot symbol in the synchronization part. The second pilot symbol of the synchronization part can be spaced Q multicarrier symbols apart from the first pilot symbol of the synchronization part.

In a fourth implementation form according to the second aspect as such or any preceding implementation form of the second aspect, the processor is further configured to determine a fractional symbol timing offset of the received M multicarrier symbols upon the basis of a correlation function between the corrected multicarrier signal and a reference synchronization part of the multicarrier signal, to correct the corrected multicarrier signal upon the basis of the determined fractional symbol timing offset for obtaining a re-corrected multicarrier signal, to extract the pilot symbols of the re-corrected multicarrier signal, to determine a residual carrier frequency offset of the received K1 and/or K2 frequency sub-channels upon the basis of the extracted pilot symbols of the re-corrected multicarrier signal, and to correct the re-corrected multicarrier signal upon the basis of the determined residual carrier frequency offset. Thus, a more efficient frequency-domain based synchronization scheme can be realized.

The fractional symbol timing offset can relate to a fractional symbol timing offset between a symbol timing of the filterbank-based multicarrier receiver and a symbol timing of the received multicarrier signal.

The correlation function between the corrected multicarrier signal and the reference synchronization part of the multicarrier signal can relate to an energy measure between the corrected multicarrier signal and the reference synchronization part of the multicarrier signal.

The reference synchronization part of the multicarrier signal can relate to an ideal or un-disturbed synchronization part of the multicarrier signal. The reference synchronization part of the multicarrier signal can be stored in a memory, e.g. a Read-Only Memory (ROM), of the filterbank-based multicarrier receiver.

The residual carrier frequency offset can relate to a frequency offset between a carrier frequency of the filterbank-based multicarrier receiver and a carrier frequency of the received multicarrier signal.

In a fifth implementation form according to the fourth implementation form of the second aspect, the processor is configured to determine the fractional symbol timing offset according to the following equations:

$$\hat{\tau} = \underset{\tilde{\tau}}{\operatorname{argmax}}\left(\frac{\left|\sum_{k\in\mathbb{K}}\sum_{q\in[0,2]}w_k^{-\frac{1}{2}}Y'_{k,\hat{m}+q}S^*_{k,q}e^{j\frac{2\pi}{K}k\tau}\right|}{\Gamma_{S+Y}[\hat{m}]}\right)$$

$$\Gamma_{Y+S}[m] = \frac{1}{2}\sum_{k\in\mathbb{K}}\sum_{q\in[0,2]}(|Y'_{k,m+q}|^2 + |S_{k,q}|^2)$$

wherein $Y_{k,m+q}'$ denotes values of the corrected multicarrier signal for frequency sub-channel index k and multicarrier symbol indices m and q, $S_{k,q}$ denotes values of a reference synchronization part of the multicarrier signal for frequency sub-channel index k and multicarrier symbol index q, $\hat{m}$ denotes the determined initial symbol timing offset, K denotes a number of sub-channels, $\omega_k$ denotes normalized weights, $\mathbb{K}$ denotes a set of indices of frequency sub-channels, $\Gamma_{Y+S}[m]$ denotes a normalized value, $(\cdot)^*$ denotes complex conjugation and $\hat{\tau}$ denotes the determined fractional symbol timing offset. Thus, the fractional symbol timing offset can be determined efficiently.

The number of sub-channels K can be equal to the number of sub-channels of the synchronization part K1 or the number of sub-channels of the payload part K2.

In a sixth implementation form according to the fourth implementation form of the second aspect or the fifth implementation form of the second aspect, the processor is configured to determine the residual carrier frequency offset according to the following equation:

$$\hat{f}''_\Delta = \frac{1}{2\pi}\angle\left(\sum_{l\in\mathbb{L}}w_l\frac{-P''^Y_{l,2}}{P''^Y_{l,1}}\right)$$

wherein $P_{l,1}^{Y''}$ denotes values of a first extracted pilot symbol of the re-corrected multicarrier signal for frequency sub-channel index l, $P_{l,2}^{Y''}$ denotes values of a second extracted pilot symbol of the re-corrected multicarrier signal for frequency sub-channel index l, $w_l$ denotes normalized weights, $\mathbb{L}$ denotes a subset of $\mathbb{K}$, $\mathbb{K}$ denotes a set of indices of frequency sub-channels, $\mathbb{L}$ comprises the indices of assigned frequency sub-channels, $\angle(\cdot)$ denotes an argument of a complex number and $\hat{f}''_\Delta$ denotes the determined residual carrier frequency offset. Thus, the residual carrier frequency offset can be determined efficiently.

The first extracted pilot symbol and the second extracted pilot symbol can relate to subsequent pilot symbols of the synchronization part. The first extracted pilot symbol can be the first pilot symbol in the synchronization part. The second extracted pilot symbol can be the second pilot symbol in the synchronization part. The second pilot symbol of the synchronization part can be spaced Q multicarrier symbols apart from the first pilot symbol of the synchronization part.

In a seventh implementation form according to the second aspect as such or any preceding implementation form of the second aspect, the processor is further configured to determine a channel transfer function value upon the basis of the extracted pilot symbols of the re-corrected multicarrier signal and reference pilot symbols of the multicarrier signal. Thus, an indication of the multicarrier signal propagation conditions between a filterbank-based multicarrier transmitter and a filterbank-based multicarrier receiver can be obtained.

The channel transfer function value can indicate signal attenuation and/or signal phase shift of a sub-carrier of the multicarrier signal. The channel transfer function value can be a complex number, e.g. 2+5j. For the case of OQAM the channel transfer function value can only be a real or pure imaginary number.

The reference pilot symbols of the multicarrier signal can relate to ideal or un-disturbed pilot symbols of the multicarrier signal. The reference pilot symbols of the multicarrier signal can be stored in a memory, e.g. a Read-Only Memory (ROM), of the filterbank-based multicarrier receiver. The reference pilot symbols can be part of the reference synchronization part of the multicarrier signal.

In an eighth implementation form according to the seventh implementation form of the second aspect, the processor is configured to determine the channel transfer function value according to the following equation:

$$\hat{H}_l = \frac{1}{2}\sum_{v\in[1,2]}P''^Y_{l,v}/P^S_{l,v}$$

wherein $P_{l,v}^{Y''}$ denotes values of a $v^{th}$ extracted pilot symbol of the re-corrected multicarrier signal for frequency sub-channel index l, $P_{l,v}^{S}$ denotes values of a $v^{th}$ reference pilot symbol of the multicarrier signal for frequency sub-channel index l and $\hat{H}_l$ denotes the determined channel transfer function value. Thus, the channel transfer function value can be determined efficiently.

In a ninth implementation form according to the second aspect as such or any preceding implementation form of the second aspect, the filterbank-based multicarrier receiver further comprises a communication interface being configured to receive the multicarrier signal. Thus, the filterbank-based multicarrier receiver can receive the multicarrier signal in the radio frequency domain.

The communication interface can be configured to convert the multicarrier signal from radio frequency domain into baseband domain. The communication interface can comprise an analog-to-digital-converter, a filter, an amplifier, and/or an antenna for receiving the multicarrier signal.

According to a third aspect, the embodiment of the invention relates to a filterbank-based multicarrier communication system, comprising the filterbank-based multicarrier transmitter according to the first aspect as such or any implementation form of the first aspect, and the filterbank-based multicarrier receiver according to the second aspect as such or any implementation form of the second aspect. Thus, an efficient frequency-domain based synchronization scheme can be realized.

The filterbank-based multicarrier (FBMC) communication system can relate to an offset-quadrature-amplitude-modulation orthogonal-frequency-division-multiplexing (OQAM-OFDM) communication system, a filtered-multi-tone (FMT) communication system, and/or a generalized multicarrier (GMC) communication system.

The filterbank-based multicarrier transmitter can transmit a multicarrier signal to the filterbank-based multicarrier receiver. The filterbank-based multicarrier receiver can synchronize on the received multicarrier signal in order to demodulate the multicarrier signal and/or to retrieve the payload values from the multicarrier signal.

According to a fourth aspect, the embodiment of the invention relates to a filterbank-based multicarrier transmitting method for transmitting a multicarrier signal, the multicarrier signal comprising a synchronization part and a payload part, the synchronization part comprising K1 frequency sub-channels, the payload part comprising K2 frequency sub-channels, the K1 frequency sub-channels of the synchronization part being arranged to form M subsequent multicarrier symbols, the method comprising assigning subsequent pilot values of a pilot sequence to every $P^{th}$ frequency sub-channel of the K1 frequency sub-channels of the synchronization part to obtain a pilot symbol of the multicarrier signal, wherein P is greater than 1, assigning subsequent payload values of a payload sequence to subsequent frequency sub-channels of the K2 frequency sub-channels of the payload part to obtain a payload symbol of the multicarrier signal, and assigning subsequent groups of subsequent pilot values to every $Q^{th}$ symbol of the M multicarrier symbols, wherein Q is equal to or greater than 1. Thus, an efficient frequency-domain based synchronization scheme can be realized.

The filterbank-based multicarrier transmitting method can be performed by the filterbank-based multicarrier transmitter according to the first aspect as such or any implementation form of the first aspect.

Further features of the filterbank-based multicarrier transmitting method can result from the functionality of the filterbank-based multicarrier transmitter according to the first aspect as such or any implementation form of the first aspect.

According to a fifth aspect, the embodiment of the invention relates to a filterbank-based multicarrier receiving method for receiving a multicarrier signal, the received multicarrier signal comprising a synchronization part and a payload part, the synchronization part comprising K1 frequency sub-channels, the payload part comprising K2 frequency sub-channels, the K1 frequency sub-channels of the synchronization part being arranged to form M subsequent received multicarrier symbols, wherein subsequent pilot values of a pilot sequence are assigned to every $P^{th}$ frequency sub-channel of the K1 frequency sub-channels of the synchronization part to obtain a pilot symbol of the multicarrier signal, and wherein subsequent payload values of a payload sequence are assigned to subsequent frequency sub-channels of the K2 frequency sub-channels of the payload part to obtain a payload symbol of the multicarrier signal, wherein P is greater than 1, and wherein subsequent groups of subsequent pilot values are assigned to every $Q^{th}$ symbol of the M multicarrier symbols, wherein Q is equal to or greater than 1, the method comprising determining an initial symbol timing offset of the received M multicarrier symbols upon the basis of a correlation function between the received multicarrier signal and a shifted version of the received multicarrier signal by a value of Q symbols, extracting the pilot symbols of the multicarrier signal upon the basis of the determined initial symbol timing offset, determining a carrier frequency offset of the received K1 and/or K2 frequency sub-channels upon the basis of the extracted pilot symbols of the multicarrier signal, and correcting the multicarrier signal upon the basis of the determined initial symbol timing offset and/or the determined carrier frequency offset. Thus, an efficient frequency-domain based synchronization scheme can be realized.

The filterbank-based multicarrier receiving method can be performed by the filterbank-based multicarrier receiver according to the second aspect as such or any implementation form of the second aspect.

Further features of the filterbank-based multicarrier receiving method can result from the functionality of the filterbank-based multicarrier receiver according to the second aspect as such or any implementation form of the second aspect.

According to a sixth aspect, the embodiment of the invention relates to a communication device being programmably arranged to execute the method according to the fourth aspect or the fifth aspect. Thus, the methods can be applied in an automatic and repeatable manner.

The communication device can comprise a communication interface for transmitting a multicarrier signal or for receiving a multicarrier signal, and a processor for performing the method steps as described herein.

According to a seventh aspect, the embodiment of the invention relates to a computer program for performing the method according to the fourth aspect as such or the fifth aspect as such when executed on a computer. Thus, the methods can be applied in an automatic and repeatable manner.

The computer program can be provided in form of a machine-readable code. The computer program can comprise a series of commands for a processor of the computer. The processor of the computer can be configured to execute the computer program.

The computer can comprise a processor, a memory, and/or input/output means.

The embodiments of the invention can be implemented in hardware and/or software.

Based on the above-mentioned aspects and implementation forms, the embodiments of the invention may also relate to a sequence design and synchronization scheme for frequency-domain synchronization in filterbank-based multicarrier systems.

Based on the above-mentioned aspects and implementation forms, the embodiments of the invention may relate to radio access techniques in cellular communication systems, time and frequency synchronization and/or estimation techniques, or adaptive radio transmission techniques.

Based on the above-mentioned aspects and implementation forms, the embodiments of the invention may utilize a specially designed synchronization part embedded into the multicarrier signal or transmission frame.

Based on the above-mentioned aspects and implementation forms, the embodiments of the invention may perform synchronization in the frequency-domain, considering adaptively configuring the multicarrier signal or waveform allocation per communication link, per device, per user or per user group.

Based on the above-mentioned aspects and implementation forms, the embodiments of the invention may relate to a synchronization part design, synchronization sequence design or synchronization structure design and a corresponding receiving procedure for downlink or uplink signal transmission, which can allow for synchronization at the receiver after passing through a demodulation stage.

Based on the above-mentioned aspects and implementation forms, the synchronization part or synchronization sequence can be placed at the beginning of a transmission packet, denoted as preamble, or placed in the middle of a transmission packet, denoted as midamble.

Based on the above-mentioned aspects and implementation forms, the embodiments of the invention may achieve coarse and fine synchronization in a strong in-band interference or non-contiguous spectrum allocation scenario, without pre-filtering or without linearly increasing implementation complexity with the number of users.

Based on the above-mentioned aspects and implementation forms, the embodiments of the invention may relate to a preamble design or a midamble design, and a corresponding receiving procedure for downlink or uplink signal transmission in order to perform synchronization in a shared spectrum scenario.

Based on the above-mentioned aspects and implementation forms, the embodiments of the invention may enable an efficient preamble or midamble design using significantly less overhead symbols compared to approaches for time-domain based synchronization while supporting nearly the same estimation range for symbol timing offset estimation and carrier frequency offset estimation.

Based on the above-mentioned aspects and implementation forms, the embodiments of the invention may be based on the use of a specific data-aided synchronization part structure to enable synchronization in frequency-domain.

Based on the above-mentioned aspects and implementation forms, the embodiments of the invention may enable an initial frame detection and estimation of an integer and fractional symbol timing offset and carrier frequency offset in the frequency-domain.

Based on the above and under certain conditions the following advantages can be achieved by the embodiments of the invention:

The embodiments of the invention can enable an efficient performance of synchronization schemes in dynamic and/or shared spectrum access and inter-operator sharing scenarios.

The embodiments of the invention can perform the task of synchronization in a filterbank-based multicarrier system in the frequency-domain for a range of carrier frequency offset values and symbol timing offset values without significant penalties compared to time-domain based synchronization with reasonable overhead for the synchronization part.

The embodiments of the invention can achieve synchronization at lower costs and with higher interference rejection capabilities than e.g. time-domain based synchronization schemes.

The embodiments of the invention can allow separating different users, interferences or signals with similar frequencies before performing synchronization, improving the robustness of the communication system against in-band interference.

The synchronization can be made robust against any in-band interference by using the presented synchronization part or synchronization sequence and the presented synchronization scheme.

The ability to adaptively mask interference before performing synchronization can result in a high reliability and few connection losses in filterbank-based multicarrier communication systems.

The embodiments of the invention can enable a preamble or midamble design which is applicable in fragmented resource allocation and coexistence scenarios with a high degree of flexibility and scalability, e.g. for Machine-to-Machine (M2M) communication or broadband communication.

The embodiments of the invention can enable that a particular, e.g. real-valued, synchronization part or synchronization sequence can be chosen freely, allowing to meet additional design goals, e.g. a low Peak-to-Average Power Ratio (PAPR) or other adjustable time-domain properties of the multicarrier signal.

The multicarrier signal can be applied for time-domain synchronization schemes and/or frequency-domain synchronization schemes, thus enabling hybrid receiver structures.

BRIEF DESCRIPTION OF THE DRAWINGS

Further embodiments of the invention will be described with respect to the following figures, in which.

DETAILED DESCRIPTION

Figure 1:
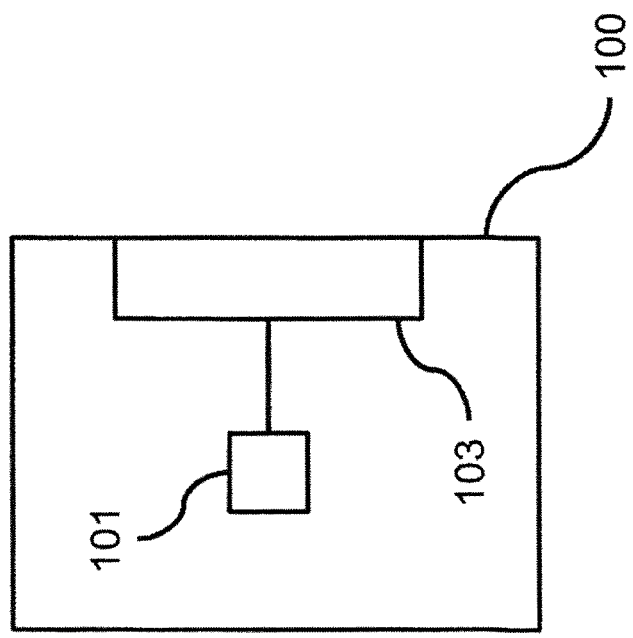
FIG. 1 shows a schematic diagram of a filterbank-based multicarrier transmitter.

FIG. 1 shows a schematic diagram of a filterbank-based multicarrier transmitter 100. The filterbank-based multicarrier transmitter 100 comprises a processor 101 and a communication interface 103.

The filterbank-based multicarrier transmitter 100 can be configured to transmit a multicarrier signal, the multicarrier signal comprising a synchronization part and a payload part, the synchronization part comprising K1 frequency sub-channels, the payload part comprising K2 frequency sub-channels, the K1 frequency sub-channels of the synchronization part being arranged to form M subsequent multicarrier symbols.

The processor 101 can be configured to assign subsequent pilot values of a pilot sequence to every $P^{th}$ frequency sub-channel of the K1 frequency sub-channels of the synchronization part to obtain a pilot symbol of the multicarrier signal, and to assign subsequent payload values of a payload sequence to subsequent frequency sub-channels of the K2 frequency sub-channels of the payload part to obtain a payload symbol of the multicarrier signal, wherein P is greater than 1, and wherein the processor 101 can be configured to assign subsequent groups of subsequent pilot values to every $Q^{th}$ symbol of the M multicarrier symbols, wherein Q is equal to or greater than 1.

The filterbank-based multicarrier (FBMC) transmitter 100 can relate to an offset-quadrature-amplitude-modulation orthogonal-frequency-division-multiplexing (OQAM-OFDM) transmitter, a filtered-multitone (FMT) transmitter, and/or a generalized multicarrier (GMC) transmitter.

The synchronization part can be intended for allowing an efficient synchronization of a filterbank-based multicarrier receiver on a received multicarrier signal.

The payload part can be intended for carrying payload data between the filterbank-based multicarrier transmitter 100 and a filterbank-based multicarrier receiver.

The frequency sub-channel can relate to a carrier frequency of a sub-carrier of the multicarrier signal. The number of frequency sub-channels K1 of the synchronization part can be a natural number, e.g. 8 or 256. The number of frequency sub-channels K2 of the payload part can be a natural number, e.g. 16 or 128, or zero. If K2 is equal to zero no payload is sent. The number of frequency sub-channels K1 of the synchronization part and the number of frequency sub-channels K2 of the payload part can be different. The number P can be a natural number, e.g. 2 or 3.

The multicarrier symbol can comprise a number of values for a number of frequency sub-channels within a symbol time. The number of subsequent multicarrier symbols M can be a natural number, e.g. 4 or 6. The number Q can be a natural number, e.g. 2 or 3.

The pilot sequence can comprise a number of pilot values. The pilot values can be complex numbers, e.g. 1+1j or 4−3j. For the case of OQAM the pilot values can only be real or pure imaginary numbers. The pilot symbol can comprise a number of pilot values for a number of frequency sub-channels within a symbol time.

The payload sequence can comprise a number of payload values. The payload values can be complex numbers, e.g. 1+2j or 4−2j. For the case of OQAM the payload values can only be real or pure imaginary numbers. The payload symbol can comprise a number of payload values for a number of frequency sub-channels within a symbol time.

The processor 101 can be configured to execute a computer program.

The communication interface 103 can be configured to transmit the multicarrier signal.

The communication interface 103 can be configured to convert the multicarrier signal from baseband domain into radio frequency domain. The communication interface 103 can comprise a digital-to-analog-converter, a filter, an amplifier, and/or an antenna for transmitting the multicarrier signal.

The processor 101 and the communication interface 103 can be connected.

Figure 2:
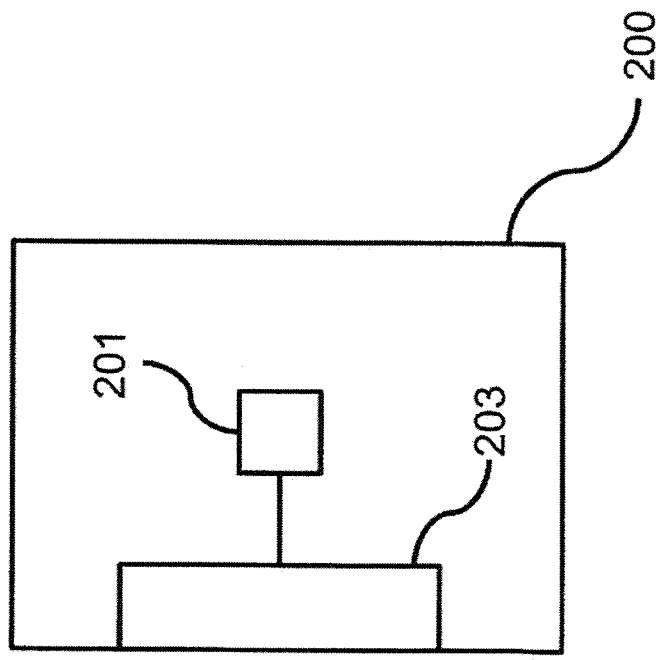
FIG. 2 shows a schematic diagram of a filterbank-based multicarrier receiver.

FIG. 2 shows a schematic diagram of a filterbank-based multicarrier receiver 200. The filterbank-based multicarrier receiver 200 comprises a processor 201 and a communication interface 203.

The filterbank-based multicarrier receiver 200 can be configured to receive a multicarrier signal, the received multicarrier signal comprising a synchronization part and a payload part, the synchronization part comprising K1 frequency sub-channels, the payload part comprising K2 frequency sub-channels, the K1 frequency sub-channels of the synchronization part being arranged to form M subsequent received multicarrier symbols, wherein subsequent pilot values of a pilot sequence are assigned to every $P^{th}$ frequency sub-channel of the K1 frequency sub-channels of the synchronization part to obtain a pilot symbol of the multicarrier signal, and wherein subsequent payload values of a payload sequence are assigned to subsequent frequency sub-channels of the K2 frequency sub-channels of the payload part to obtain a payload symbol of the multicarrier signal, wherein P is greater than 1, and wherein subsequent groups of subsequent pilot values are assigned to every $Q^{th}$ symbol of the M multicarrier symbols, wherein Q is equal to or greater than 1.

The processor 201 can be configured to determine an initial symbol timing offset of the received M multicarrier symbols upon the basis of a correlation function between the received multicarrier signal and a shifted version of the received multicarrier signal by a value of Q symbols, to extract the pilot symbols of the multicarrier signal upon the basis of the determined initial symbol timing offset, to determine a carrier frequency offset of the received K1 and/or K2 frequency sub-channels upon the basis of the extracted pilot symbols of the multicarrier signal, and to correct the multicarrier signal upon the basis of the determined initial symbol timing offset or the determined carrier frequency offset.

The processor 201 can be configured to shift the multicarrier signal in time or in frequency in order to correct the multicarrier signal.

The processor 201 can be further configured to determine a fractional symbol timing offset of the received M multicarrier symbols upon the basis of a correlation function between the corrected multicarrier signal and a reference synchronization part of the multicarrier signal, to correct the corrected multicarrier signal upon the basis of the determined fractional symbol timing offset for obtaining a re-corrected multicarrier signal, to extract the pilot symbols of the re-corrected multicarrier signal, to determine a residual carrier frequency offset of the received K1 or K2 frequency sub-channels upon the basis of the extracted pilot symbols of the re-corrected multicarrier signal, and to correct the re-corrected multicarrier signal upon the basis of the determined residual carrier frequency offset.

The processor 201 can be further configured to determine a channel transfer function value upon the basis of the extracted pilot symbols of the re-corrected multicarrier signal and reference pilot symbols of the multicarrier signal.

The filterbank-based multicarrier (FBMC) receiver 200 can relate to an offset-quadrature-amplitude-modulation orthogonal-frequency-division-multiplexing (OQAM-OFDM) receiver, a filtered-multitone (FMT) receiver, and/or a generalized multicarrier (GMC) receiver.

The synchronization part can be intended for allowing an efficient synchronization of the filterbank-based multicarrier receiver 200 on a received multicarrier signal.

The payload part can be intended for carrying payload data between a filterbank-based multicarrier transmitter and the filterbank-based multicarrier receiver 200.

The frequency sub-channel can relate to a carrier frequency of a sub-carrier of the multicarrier signal. The number of frequency sub-channels K1 of the synchronization part can be a natural number, e.g. 8 or 256. The number of frequency sub-channels K2 of the payload part can be a natural number, e.g. 16 or 128, or zero. If K2 is equal to zero no payload is sent. The number of frequency sub-channels K1 of the synchronization part and the number of frequency sub-channels K2 of the payload part can be different. The number P can be a natural number, e.g. 2 or 3.

The multicarrier symbol can comprise a number of values for a number of frequency sub-channels within a symbol time. The number of subsequent multicarrier symbols M can be a natural number, e.g. 4 or 6. The number Q can be a natural number, e.g. 2 or 3.

The pilot sequence can comprise a number of pilot values. The pilot values can be complex numbers, e.g. 1+1j or 4−3j. For the case of OQAM the pilot values can only be real or pure imaginary numbers. The pilot symbol can comprise a number of pilot values for a number of frequency sub-channels within a symbol time.

The payload sequence can comprise a number of payload values. The payload values can be complex numbers, e.g. 1+2j or 4−2j. For the case of OQAM the payload values can only be real or pure imaginary numbers. The payload symbol can comprise a number of payload values for a number of frequency sub-channels within a symbol time.

The initial symbol timing offset can relate to an integer symbol timing offset between a symbol timing of the filterbank-based multicarrier receiver 200 and a symbol timing of a received multicarrier signal.

The correlation function between the received multicarrier signal and the shifted version of the received multicarrier signal can relate to an energy measure between the received multicarrier signal and the shifted version of the received multicarrier signal.

The carrier frequency offset can relate to a frequency offset between the carrier frequency of the filterbank-based multicarrier receiver 200 and a carrier frequency of a received multicarrier signal.

The processor 201 can be configured to execute a computer program.

The communication interface 203 can be configured to receive the multicarrier signal.

The communication interface 203 can be configured to convert the multicarrier signal from radio frequency domain into baseband domain. The communication interface 203 can comprise an analog-to-digital-converter, a filter, an amplifier, and/or an antenna for receiving the multicarrier signal.

The processor 201 and the communication interface 203 can be connected.

Figure 3:
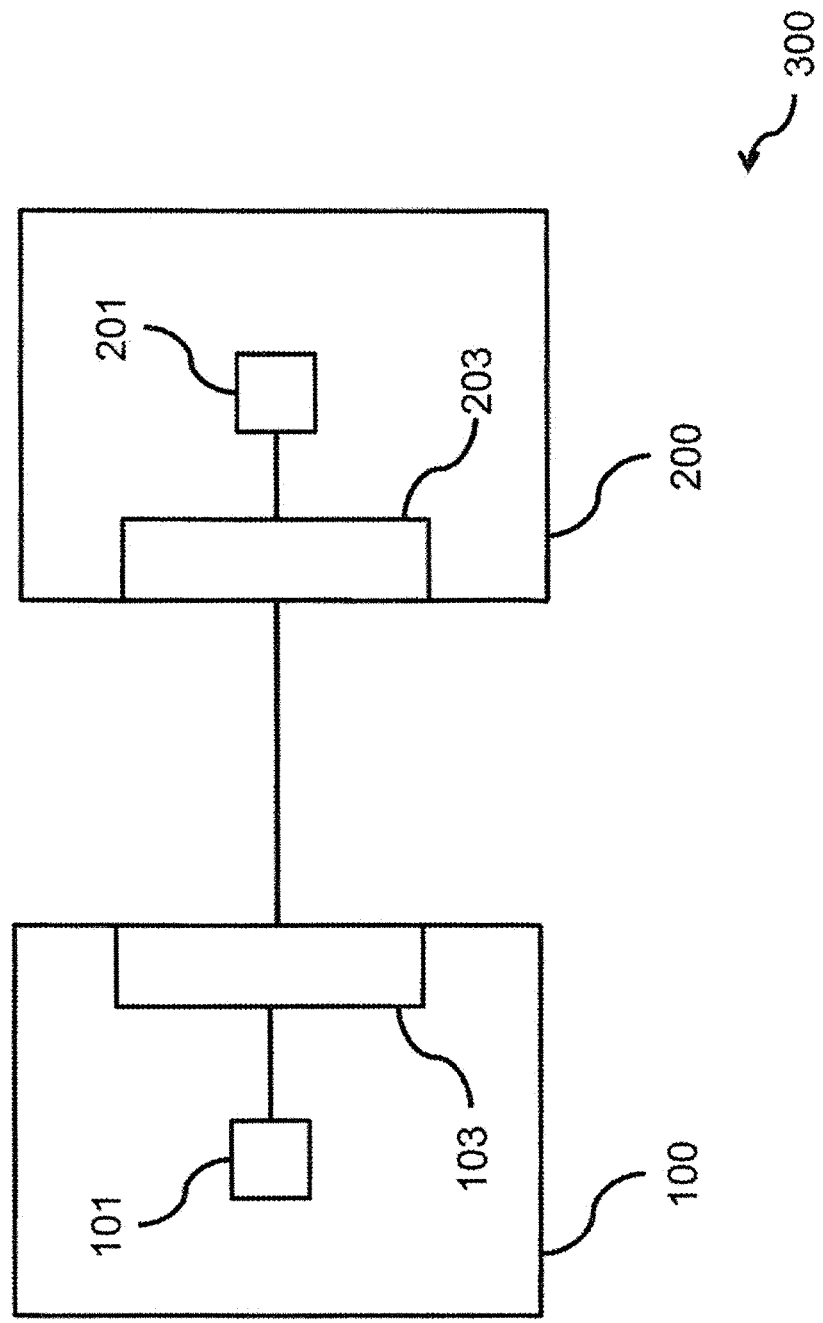
FIG. 3 shows a schematic diagram of a filterbank-based multicarrier communication system.

FIG. 3 shows a schematic diagram of a filterbank-based multicarrier communication system 300. The filterbank-based multicarrier communication system 300 comprises a filterbank-based multicarrier transmitter 100 and a filterbank-based multicarrier receiver 200. The filterbank-based multicarrier transmitter 100 comprises a processor 101 and a communication interface 103. The filterbank-based multicarrier receiver 200 comprises a processor 201 and a communication interface 203.

The filterbank-based multicarrier (FBMC) communication system 300 can relate to an offset-quadrature-amplitude-modulation orthogonal-frequency-division-multiplexing (OQAM-OFDM) communication system, a filtered-multitone (FMT) communication system, and/or a generalized multicarrier (GMC) communication system.

The filterbank-based multicarrier transmitter 100 can transmit a multicarrier signal to the filterbank-based multicarrier receiver 200. The filterbank-based multicarrier receiver 200 can synchronize on the received multicarrier signal in order to demodulate the multicarrier signal and/or to retrieve the payload values from the multicarrier signal.

The filterbank-based multicarrier transmitter 100 and the filterbank-based multicarrier receiver 200 can be connected by a wired connection or a wireless connection.

Figure 4:
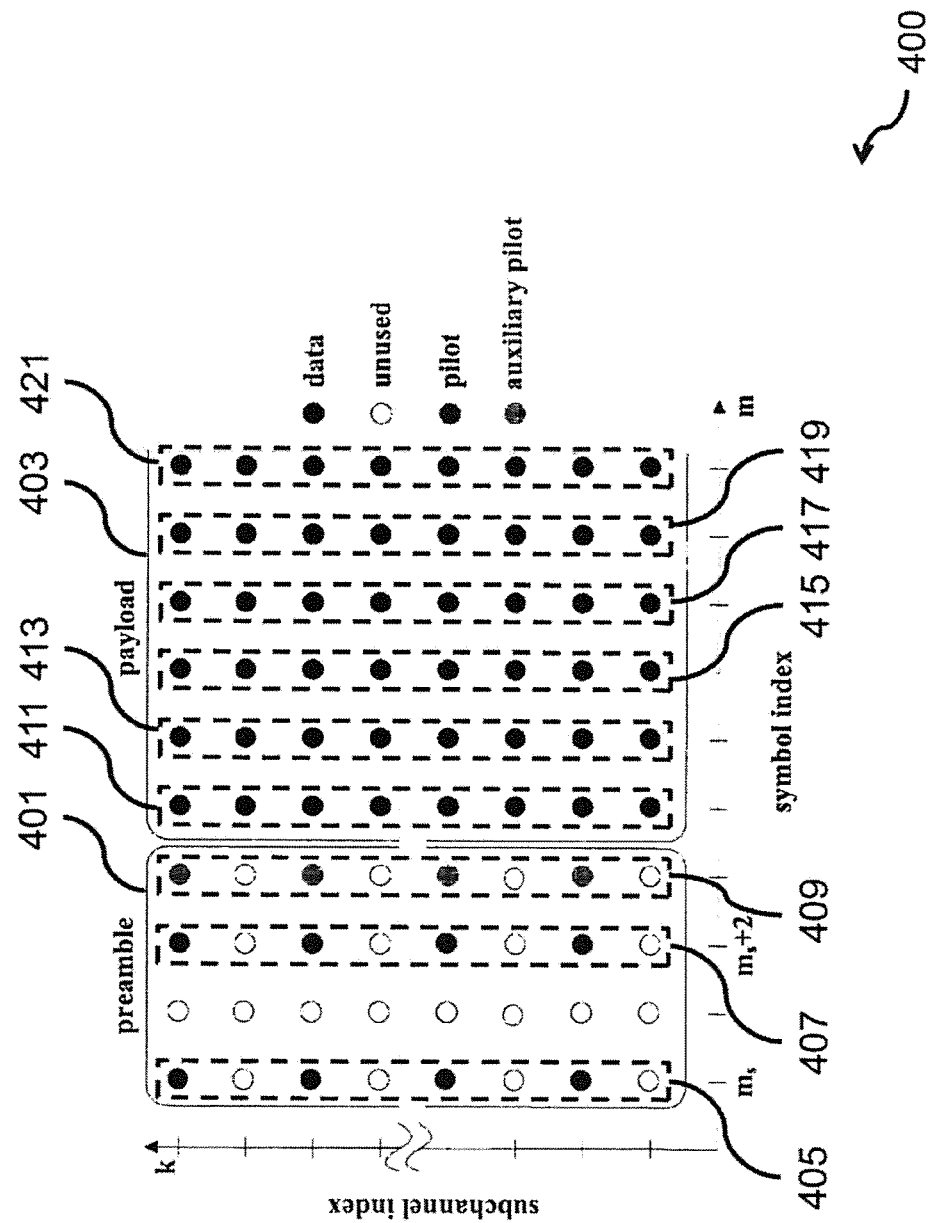
FIG. 4 shows a schematic diagram of an arrangement of a synchronization part and a payload part of a multicarrier signal.

FIG. 4 shows a schematic diagram 400 of an arrangement of a synchronization part 401 and a payload part 403 of a multicarrier signal. The diagram 400 further comprises a first pilot symbol 405, a second pilot symbol 407, an auxiliary pilot symbol 409, and a number of payload symbols 411, 413, 415, 417, 419, 421.

The synchronization part 401 is arranged to precede the payload part 403, the synchronization part 401 being a preamble of the multicarrier signal.

The synchronization part 401 comprises eight frequency sub-channels, i.e. K1=8, and four subsequent multicarrier symbols, i.e. M=4. Subsequent pilot values are assigned to every second frequency sub-channel, i.e. P=2. Subsequent groups of subsequent pilot values are assigned to every second symbol, i.e. Q=2.

The synchronization part 401 further comprises an auxiliary pilot symbol 409. The auxiliary pilot symbol 409 is assigned to the multicarrier symbol between the last or second pilot symbol 407 of the synchronization part 401 and the first payload symbol 411 of the payload part 403.

The payload part 403 comprises eight frequency sub-channels, i.e. K2=8. Subsequent payload values are assigned to subsequent frequency sub-channels.

Non-assigned multicarrier symbols and/or frequency sub-channels are assigned zero values.

In a possible implementation of the preamble arrangement of the synchronization part 401 and the payload part 403, the preamble arrangement of the synchronization part 401 and the payload part 403 can be used in burst-mode multicarrier signal transmission.

In a possible implementation of the arrangement of the synchronization part 401, the synchronization part 401 can comprise N'*2 OQAM symbols or N' complex symbols, with N' pilot symbols 405, 407, e.g. be 2. The pilot symbols 405, 407 can be embedded into the structure with an interval of M', e.g. M' to be 1, i.e. one every two symbols. The pilot symbols 405, 407 can be embedded in the frequency sub-channels or sub-carriers with an interval of P', e.g. P' to be 1, i.e. one every two frequency sub-channels or sub-carriers. For the last symbol, which is close to the payload part 403, one auxiliary pilot symbol 409 is inserted to counter the imaginary interference from the payload part 403, which is placed at the same frequency sub-channel or sub-carrier but in the next close by OQAM symbol, i.e. either before or after the last or second pilot symbol 407. The diagram 400 exemplary depicts the case of N'=2, M'=1, P'=1, and an auxiliary pilot symbol 409 after the last or second pilot symbol 407.

In a possible implementation of the arrangement of the synchronization part 401, the remaining symbols or rest symbols are assigned a value of 0, i.e. the symbols are unused.

In a possible implementation of the arrangement of the synchronization part 401, the synchronization part 401 can comprise 4 OQAM-OFDM symbols with T/2 spacing in the time domain. The assigned pilot values can be distributed over the even or odd frequency sub-channels or sub-carriers in the first OFDM-OQAM symbol. The assigned pilot values can be repeated in the third OFDM-OQAM symbol. The second OFDM-OQAM symbol can be left empty. The fourth OFDM-OQAM symbol can be left empty or can be used by auxiliary pilot values on the even or odd frequency sub-channels or sub-carriers. The synchronization part 401 can represent a preamble heading the transmission frame or payload part 403.

In a possible implementation of the arrangement of the diagram 400, the diagram 400 relates to a frame structure comprising symbols $D_{k,m}$ over the TF-plane spanned by the frequency sub-channel indices and OFDM symbol indices. The synchronization block or synchronization part 401 $S_{k,m}$ can be inserted ahead of the payload data or payload part 403 as a preamble. The pattern of data-bearing symbols can be continued over the whole range of utilized frequency sub-channels from the set $\mathbb{K}$.

In a possible implementation of the arrangement of the diagram 400, the case of Q greater than 1 is desirable if an OQAM signaling scheme is used, wherein the symbol spacing is T/2, i.e. symbols overlapping by half a symbol's time or length. OQAM can be considered as a special signaling scheme, which is to be used in combination with filterbank-based multicarrier systems.

In a possible implementation of the arrangement of the synchronization part 401, the frequency sub-channels or sub-carriers, which are not intended to be used, is assigned a value of 0, i.e. no pilot symbols are embedded there.

Figure 5:
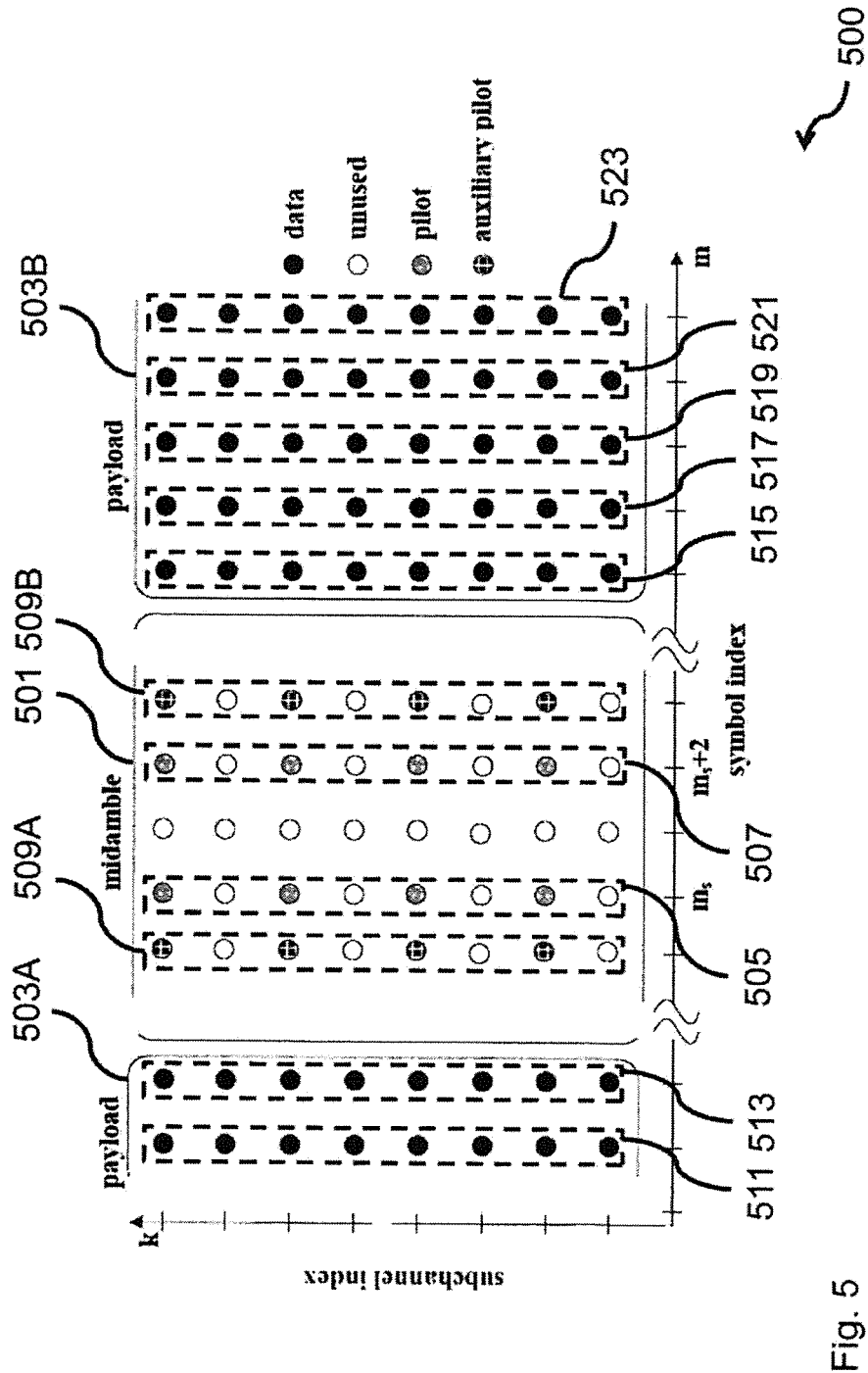
FIG. 5 shows a schematic diagram of an arrangement of a synchronization part and two payload parts of a multicarrier signal.

FIG. 5 shows a schematic diagram 500 of an arrangement of a synchronization part 501 and two payload parts 503A, 503B of a multicarrier signal. The diagram 500 further comprises a first pilot symbol 505, a second pilot symbol 507, a first auxiliary pilot symbol 509A, a second auxiliary pilot symbol 509B, and a number of payload symbols 511, 513, 515, 517, 519, 521, 523.

The synchronization part 501 is arranged between the two payload parts 503A and 503B, the synchronization part 501 being a midamble of the multicarrier signal.

The synchronization part 501 comprises eight frequency sub-channels, i.e. K1=8, and five subsequent multicarrier symbols, i.e. M=5. Subsequent pilot values are assigned to every second frequency sub-channel, i.e. P=2. Subsequent groups of subsequent pilot values are assigned to every second symbol, i.e. Q=2.

The synchronization part 501 further comprises two auxiliary pilot symbols 509A, 509B. The first auxiliary pilot symbol 509A is assigned to the multicarrier symbol between the last payload symbol 513 of the first payload part 503A and the first pilot symbol 505 of the synchronization part 501. The second auxiliary pilot symbol 509B is assigned to the multicarrier symbol between the last or second pilot symbol 507 of the synchronization part 501 and the first payload symbol 515 of the second payload part 503B.

The two payload parts 503A, 503B comprise eight frequency sub-channels, i.e. K2=8. Subsequent payload values are assigned to subsequent frequency sub-channels.

Non-assigned multicarrier symbols and/or frequency sub-channels are assigned zero values.

In a possible implementation of the midamble arrangement of the synchronization part 501 and the two payload parts 503A, 503B, the midamble arrangement of the synchronization part 501 and the two payload parts 503A, 503B can be used in continuous-mode multicarrier signal transmission.

In a possible implementation of the arrangement of the synchronization part 501, the synchronization part 501 can comprise N'*2+Q' OQAM symbols, with N' pilot symbols 505, 507, e.g. be 2, Q' unused symbols, e.g. be 1. The pilot symbols 505, 507 can be embedded into the structure with an interval of M', e.g. M' to be 1, i.e. one every two symbols. The pilot symbols 505, 507 can be embedded in the frequency sub-channels or sub-carriers with an interval of P', e.g. P' to be 1, i.e. one every two frequency sub-channels or sub-carriers. For the first and/or last symbol, one auxiliary pilot symbol 509A, 509B is inserted close by each of these symbols to counter the imaginary interference from the payload parts 503A, 503B. The first and/or last symbols are placed at the same frequency sub-channel or sub-carrier but before the first pilot symbol 505 and/or are placed at the same frequency sub-channel or sub-carrier but after the last or second pilot symbol 507. The diagram 500 exemplary depicts the case of N'=2, Q'=1, M'=1, P'=1.

In a possible implementation of the arrangement of the synchronization part 501, the remaining symbols or rest symbols are assigned a value of 0, i.e. the symbols are unused.

In a possible implementation of the arrangement of the synchronization part 501, the frequency sub-channels or sub-carriers, which are not intended to be used, is assigned a value of 0, i.e. no pilot symbols are embedded there.

In a possible implementation of the arrangement of the synchronization part 501, the frequency sub-channels or sub-carriers, which are not intended to be used, is assigned a value of 0, i.e. no pilot symbols are embedded there.

Figure 6:
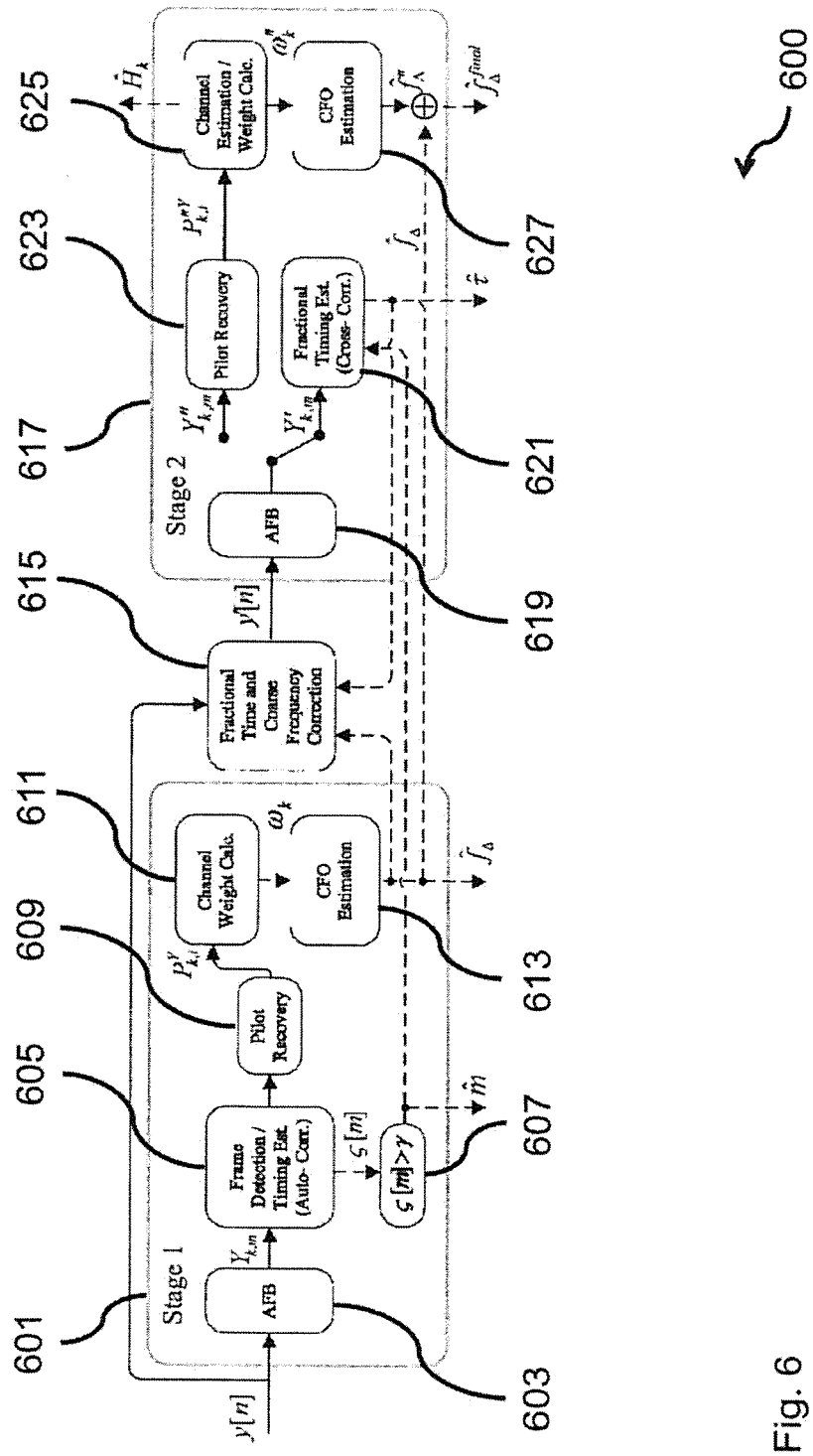
FIG. 6 shows a schematic diagram of a receiving method of a filterbank-based multicarrier receiver.

FIG. 6 shows a schematic diagram 600 of a receiving method of a filterbank-based multicarrier receiver. The diagram 600 comprises a first stage 601 comprising a first analysis filterbank (AFB) processing block 603, a frame detection and timing estimation processing block 605, a comparison processing block 607, a first pilot recovery processing block 609, a channel weight calculation processing block 611, and a first carrier frequency offset (CFO) estimation processing block 613. The diagram 600 further comprises a fractional timing and coarse frequency correction processing block 615. The diagram 600 further comprises a second stage 617 comprising a second analysis filterbank CAFE) processing block 619, a fractional timing estimation processing block 621, a second pilot recovery processing block 623, a channel estimation and weight calculation processing block 625, and a second carrier frequency offset estimation processing block 627.

Solid lines can indicate a flow of a time domain (TD) sample stream whereas dashed lines can represent the passing of estimated values between the processing blocks.

Within the first stage 601, the coarse symbol timing and CFO recovery can be performed based on an auto-correlation metric in the frequency domain (FD). The results from the first stage 601 can be used to enable residual CFO estimation and fractional symbol timing recovery in the second stage 617. After further fractional symbol timing correction the signal can be utilized for channel estimation purposes in the second stage 617.

The first analysis filterbank processing block 603 can be configured to decompose or demodulate a time-domain signal into a time-frequency-domain signal by filtering and sampling the time-domain signal.

The frame detection and timing estimation processing block 605 can be configured to determine an initial symbol timing offset upon the basis of an auto-correlation metric.

The comparison processing block 607 can be configured to determine whether the initial symbol timing offset has been successfully determined.

The first pilot recovery processing block 609 can be configured to extract the pilot symbols of the multicarrier signal.

The channel weight calculation processing block 611 can be configured to calculate channel weights upon the basis of the extracted pilot symbols.

The first carrier frequency offset estimation processing block 613 can be configured to determine a carrier frequency offset of the multicarrier signal.

The fractional timing and coarse frequency correction processing block 615 can be configured to correct and/or to re-correct a multicarrier signal and/or a corrected multicarrier signal by shifting the signal in time and/or frequency.

The second analysis filterbank processing block 619 can be configured to decompose or demodulate a time-domain signal into a time-frequency-domain signal by filtering and sampling the time-domain signal.

The fractional timing estimation processing block 621 can be configured to determine a fractional symbol timing offset upon the basis of a cross-correlation metric.

The second pilot recovery processing block 623 can be configured to extract the pilot symbols of the re-corrected multicarrier signal.

The channel estimation and weight calculation processing block 625 can be configured to calculate a channel transfer function value and/or channel weights upon the basis of the extracted pilot symbols and reference pilot symbols.

The second carrier frequency offset estimation processing block 627 can be configured to determine a residual carrier frequency offset of the multicarrier signal.

In the following, $\angle(\cdot)$ denotes the argument of a complex number in the range of $[-\pi,\pi)$, $(\cdot)^*$ denotes the complex conjugate, and $\sqrt{-1}=j$.

The estimation metric and the synchronization sequence can be designed for a critically sampled Offset-Quadrature-Amplitude-Modulation (OQAM) Orthogonal-Frequency-Division-Multiplexing (OFDM) system. The transmitted signal x[n], n being a natural number denoting the sequence number of the transmitted symbol, at a synthesis filterbank (SFB) can be given by:

$$x[n] = \sum_{m=0}^{M-1} \sum_{k \in \mathbb{K}} j^{mod(m+k,2)} D_{k,m} p_k[n - mT/2] \quad (1)$$

where M can be the number of real OQAM-OFDM symbols within a frame and $\mathbb{K}$ can be the set of sub-channels used out of K available sub-channels. $D_{k,m}$ can represent the Pulse-Amplitude-Modulation (PAM) symbols, derived through staggering of the QAM symbols, in the data frame with k and m specifying the sub-channel index and the OFDM symbol index, respectively. $D_{k,m}$ can contain the synchronization sequence $S_{k,q}$ and data symbols used for payload transmission. Thereby, $T=KT_s$ can be the time between two consecutive QAM symbols with the sampling frequency $f_s=1/T_s$. The term $T_s$ and normalization factors are discarded for simplicity in the following. The frequency-shifted version of the prototype filter function p[n], used in the synthesis filterbank (SFB) and the analysis filterbank (AFB), can be defined as $p_k[n]$ as:

$$p_k[n] = p[n] e^{j\frac{2\pi}{K}kn}. \quad (2)$$

The signal at the receiver, after passing through a multi-path channel h[n] and imposing additional noise and carrier frequency offset (CFO), can be represented by:

$$y[n] = (x[n - \tau - \mu T/2] * h[n]) e^{j\frac{2\pi}{K} f_\Delta n + \varphi} + \eta[n]. \quad (3)$$

Thereby, h[n] can denote the normalized time-discrete channel impulse response, $\eta[n]$ can describe zero mean, circular complex white Gaussian noise and $\phi$ can stand for a random phase offset. The carrier frequency offset $f_\Delta$ can be normalized with respect to the sub-channel spacing. The delay can be split into a fractional time delay $\tau$ with respect to half of an OQAM-OFDM symbol spacing T and an integer delay $\mu$. The output of the AFB can be given by $Y_{k,m}$ according to:

$$Y_{k,m} = \left[ \left( y[n] e^{-j\frac{2\pi}{K}kn} \right) * p[n] \right]_{n=\frac{mT}{2}}. \quad (4)$$

Taking the real or imaginary part of $Y_{k,m}$, depending on the indices k and m, can lead to a near orthogonal filterbank structure.

In the following, an exemplary synchronization sequence design is explained. In data-aided synchronization schemes, the distribution of the predetermined synchronization symbols over the time-frequency (TF) plane can be done in many ways to meet the demands of the actual system. For example, in OFDM-based IEEE 802.11, the synchronization symbols can be merged into one preamble heading the payload part of the frame, clearly separating the preamble part of the frame in the TD. Whereas in 3GPP LTE, the symbols can be repeatedly embedded into the payload frame structure and surrounded by payload resources and may not be clearly distinguishable in the TD signal without pre-filtering.

In FD processing, the signal at the receiver can again be spanned over the TF-lattice by the AFB, where the location of the synchronization symbols can be picked out well-directed for further processing. This can lead to a synchronization sequence design, which can in general be distributed more flexible over the TF-plane. As depicted in FIG. 4, a preamble based frame design or synchronization part design can be chosen for the investigation without limiting the results to only this design choice. Similar to the restrictions on synchronization sequences or synchronization parts in TD processing, in FD processing corresponding criteria can hold. In the presented synchronization scheme, the estimation range of the fractional symbol timing offset $\tau$ and the normalized CFO $f_\Delta$ can be defined by the distance of the data-bearing synchronization symbols, called pilots, along the frequency and time, respectively. To unambiguously estimate a maximum offset of $\tau=\pm K/4$ the pilots can be placed two sub-channels apart. In frequency direction the CFO can theoretically be estimated up to an offset of $f_\Delta=\pm 1/2$ for a pilot symbol distance of two. Additional to these design criteria on the maximum distance between pilots in the TF-plane, the self-interference, introduced by inter-symbol-interference (ISI) and/or inter-carrier-interference (ICI), when the SFB and AFB may not be matched in time and frequency, can call for a large distance between pilots. The maximum distance possible can be chosen, regarding the mentioned criteria for estimation to minimize the self-induced interference and maximize the estimation range, which can directly lead to the presented design. The introduction of auxiliary cancellation pilots, as depicted in FIG. 4, can be desirable to cancel the system-inherent interference to the pilot symbols.

The synchronization sequence block $S_{k,m}$ within the frame symbols $D_{k,m}$ can be defined as:

$$S_{k,m} = \begin{cases} +R[k], & \text{even } k \text{ for } m = m_s \\ -R[k], & \text{even } k \text{ for } m = m_s + 2 \\ 0, & \text{otherwise} \end{cases} \quad (5)$$

with R[k] being an arbitrary binary sequence. $m_s$ can indicate the position of the first synchronization symbol within the symbol stream. The change in sign from the first to the second pilot symbol can result in a more robust estimation of the timing offset under multipath conditions compared to the case with two identical signs. The pilots therein can be defined as:

$$P_{l,i} = \begin{cases} S_{l,m_s}, & i = 1 \\ S_{l,m_s+2}, & i = 2 \end{cases} \quad (6)$$

with l∈𝕃 being the subset of 𝕂 which can comprise the indices of the sub-channels with even k. The index i can represent either the first or second pilot-bearing symbol of $S_{k,m}$. If used as preamble, $m_s=0$ can be the first symbol within a frame, e.g. a synchronization part. Otherwise a preceding zero symbol including only the auxiliary pilots can be desirable as a guard symbol to lower the interference from preceding payload symbols. The symbol at position $m=m_s+3$ can be used as a guard symbol to lower the interference from the following payload symbols.

In the following, an exemplary timing and frequency offset estimation scheme is explained. The timing and frequency estimation can use a two-stage approach as depicted in FIG. 6. In the first stage, the AFB-processed signal can be auto-correlated to obtain the symbol position $\hat{m}$ of the synchronization sequence and a coarse CFO estimate, which can be used to correct the TD signal before passing it to the second stage where a cross-correlation-based metric can be used to get the time delay and to retrieve estimates for the residual CFO and channel transfer function.

The first stage can comprise an initial symbol timing and frequency recovery. Starting from the AFB output, the location of the synchronization block within the stream of $Y_{k,m}$ can be estimated using the auto-correlation metric in the FD between the pilot-bearing symbols within $S_{k,m}$. That can be summarized in the normalized detection metric:

$$\zeta[m] = \frac{\left|\sum_{l\in\mathbb{L}} -Y_{l,m} Y_{l,m+2}^*\right|}{\frac{1}{2}\sum_{l\in\mathbb{L}}(|Y_{l,m}|^2 + |Y_{l,m+2}|^2)}. \quad (7)$$

The decision whether the frame is detected or not can be performed on the metric $\zeta$ by comparing the metric value at the estimate:

$$\hat{m} = \operatorname*{argmax}_{m}(\zeta[m]) \quad (8)$$

with a predefined threshold value $\gamma$. If $\zeta[\hat{m}]>\gamma$, $\hat{m}$ can provide an estimate of the frame start in integer values of the symbol spacing T/2. Having estimated the coarse position $\hat{m}$ of the synchronization sequence $S_{k,m}$ within the symbol stream $Y_{k,m}$ in the FD, the received pilots symbols $P_{k,1}^Y$ and $P_{k,2}^Y$ within $Y_{k,m}$ can be used to coarsely estimate the CFO according to:

$$\hat{f}_\Delta = \frac{1}{2\pi}\angle\left(\sum_{l\in\mathbb{L}} w_l \frac{-P_{l,2}^Y}{P_{l,1}^Y}\right). \quad (9)$$

The normalized weights $w_l$ per pilot can be chosen to be proportional to the power of the received pilots $P_{l,i}^Y$ according to:

$$w_l = \frac{|P_{l,1}^Y|^2 + |P_{l,2}^Y|^2}{\sum_{u\in\mathbb{L}}(|P_{u,1}^Y|^2 + |P_{u,2}^Y|^2)}. \quad (10)$$

In this way a weighted estimation related to the signal power of the pilot symbols can be achieved, minimizing the influence of estimates exhibiting a higher level of noise. If only a frame detection decision or a coarse estimation of the symbol timing and CFO is desired, the second stage used to obtain the fractional symbol offsets and the residual CFO, can be skipped.

The second stage can comprise a fractional symbol timing and a residual frequency offset estimation. The estimation of the fractional timing offset $\hat{\tau}$ in relation to the symbol $\hat{m}$ can be derived from the trial values of the frequency-dependent phase-shift $\tilde{\tau}$ at which the metric, defined in (12) can achieve its maximum. It can be beneficial to include the preceding and following symbol of $\hat{m}$ in the maximum search to correct for inaccuracies of the first stage, which may be neglected in the following for the sake of simplicity. Thereby, $$x[n-\tau] \circ\!\!-\!\!\bullet X[k] e^{-j\frac{2\pi}{K}k\tau}$$

the correspondence can be used which can map the fractional time delay $\tau$ to the corresponding sub-channel-dependent phase shift $$\frac{2\pi}{K}kT$$

in the frequency domain. With the frequency-corrected signal:

$$y'[n] = y[n] e^{-j\frac{2\pi}{K}\hat{f}_\Delta n} \quad (11)$$

the estimation for $\tau$ can be achieved by the metric:

$$\hat{\tau} = \operatorname*{argmax}_{\tilde{\tau}}\left(\frac{\left|\sum_{k\in\mathbb{K}}\sum_{q\in[0,2]} w_k^{-\frac{1}{2}} Y'_{k,\hat{m}+q} S_{k,q}^* e^{j\frac{2\pi}{K}k\tilde{\tau}}\right|}{\Gamma_{S+Y}[\hat{m}]}\right) \quad (12)$$

with $\tilde{\tau}\in\{-K/4, \ldots, -1, 0, 1, \ldots, K/4-1\}$. The corresponding normalization of the metric can be calculated as:

$$\Gamma_{Y+S}[m] = \frac{1}{2}\sum_{k\in\mathbb{K}}\sum_{q\in[0,2]}(|Y'_{k,m+q}|^2 + |S_{k,q}|^2). \quad (13)$$

After one iteration loop, in which the fractional symbol timing offset can be corrected in the TD signal, the corrected signal $Y_{k,m}''$ can be used to estimate the residual CFO $\hat{f}_\Delta''$ with the help of the pilots $P_{l,i}^{Y''}$ according to $$\hat{f}_\Delta'' = \frac{1}{2\pi}\angle\left(\sum_{l\in\mathbb{L}} w_l \frac{-P_{l,2}''^Y}{P_{l,1}''^Y}\right) \quad (14)$$

to minimize the effects of ISI and ICI on the estimation. This can directly lead to the final CFO estimation $\hat{f}_\Delta^{final} = \hat{f}_\Delta + \hat{f}''_\Delta$.

In the following, an exemplary channel estimation scheme is explained. After synchronization, the pilot structure can be utilized to obtain an estimate of the channel transfer function $\hat{H}_l$ at the pilot sub-channels from the set $\mathbb{L}$ according to:

$$\hat{H}_l = \frac{1}{2} \sum_{v \in [1,2]} P''^{Y}_{l,v} / P^{S}_{l,v} \qquad (15)$$

without any additional overhead.

In a implementation of the FD synchronization scheme, the FD synchronization scheme is able to perform synchronization and channel estimation with only 4 symbols $D_{k,m}$.

In a possible implementation of the two-stage synchronization scheme, the two-stage synchronization scheme exhibits superior capabilities to estimate fractional symbol timing offsets in comparison to auto-correlation-based time-domain solutions.

In a possible implementation of the receiving procedure, the receiving is performed on a multicarrier signal comprising a synchronization part and a payload part according to diagram 400 or diagram 500.

In a possible implementation of the receiving procedure, the receiving comprises at least a two-stage synchronization scheme comprising the sub-procedures of frequency domain processing with an evaluation metric matched to the preamble or midamble, a two-stage processing with direct compensation based on the estimated offset value after the first stage, and a reusing of pilot symbols for channel estimation.

Figure 7:
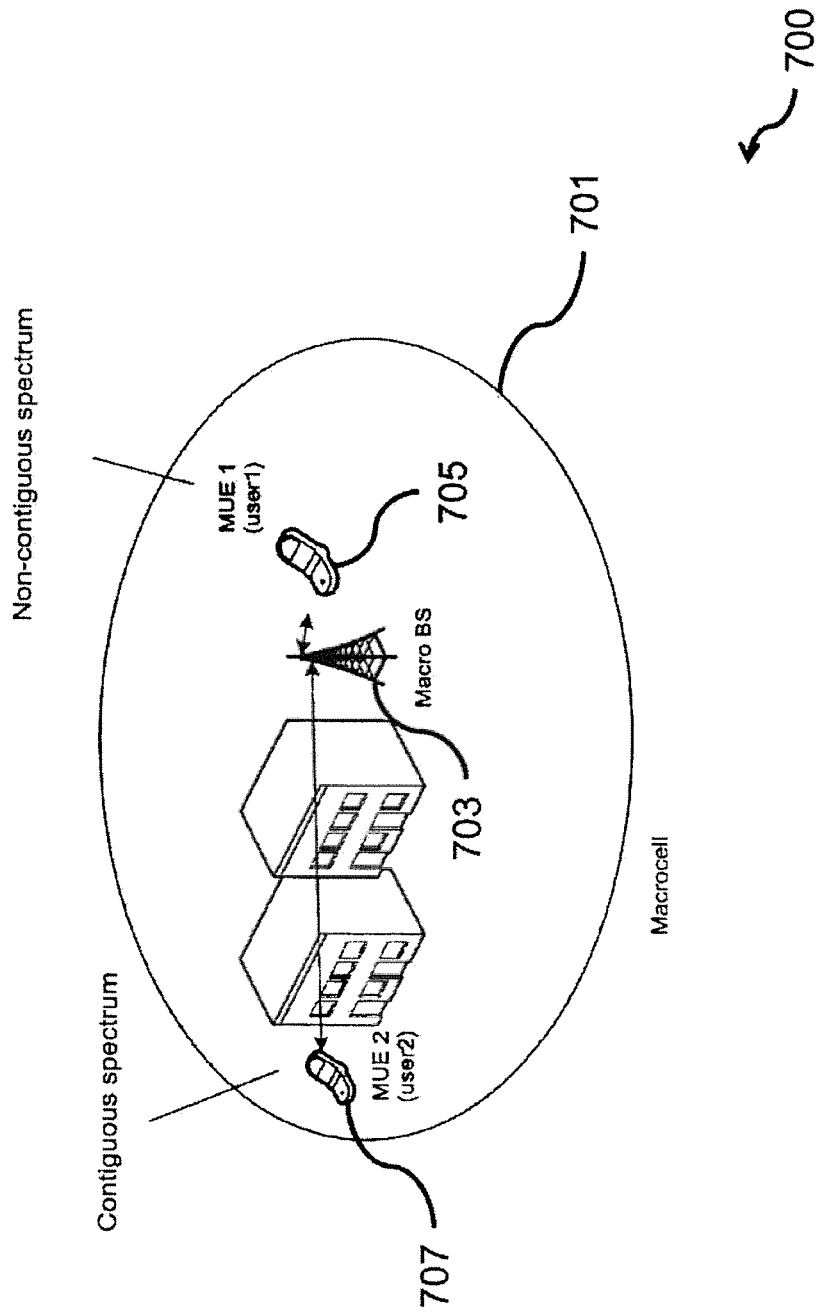
FIG. 7 shows a schematic diagram of a shared spectrum resource allocation scenario.

FIG. 7 shows a schematic diagram 700 of a shared spectrum resource allocation scenario. The diagram 700 comprises a macro-cell 701, a macro-base station 703, a first mobile device 705, and a second mobile device 707.

The diagram 700 illustrates a multi-user spectrum sharing scenario in a macro-cell 701, e.g. in a Long Term Evolution (LTE) communication system.

The macro-base station 703 transmits to the first mobile device (MUE 1) 705 or user 1 on fragmented spectrum resources, which may have been granted after a request to the white space database. The used spectrum may be non-contiguous, and it may be assumed that the spectrum hole in between the used frequency band is occupied by the second mobile device (MUE 2) 707 or user 2. If the interference from the second mobile device 707 or user 2 experienced at the first mobile device 705 or user 1 is high, time-domain based synchronization can be impaired and synchronization may fail.

Using the presented synchronization scheme, the frequency-selectivity of the filterbank used in filterbank-based multicarrier receivers can be utilized in order to perform synchronization in the frequency-domain and thus enable successful multicarrier signal transmission over fragmented frequency resources.

The described scenario refers to downlink multicarrier signal transmission. The synchronization scheme can also be applied for uplink multicarrier signal transmission.

Figure 8:
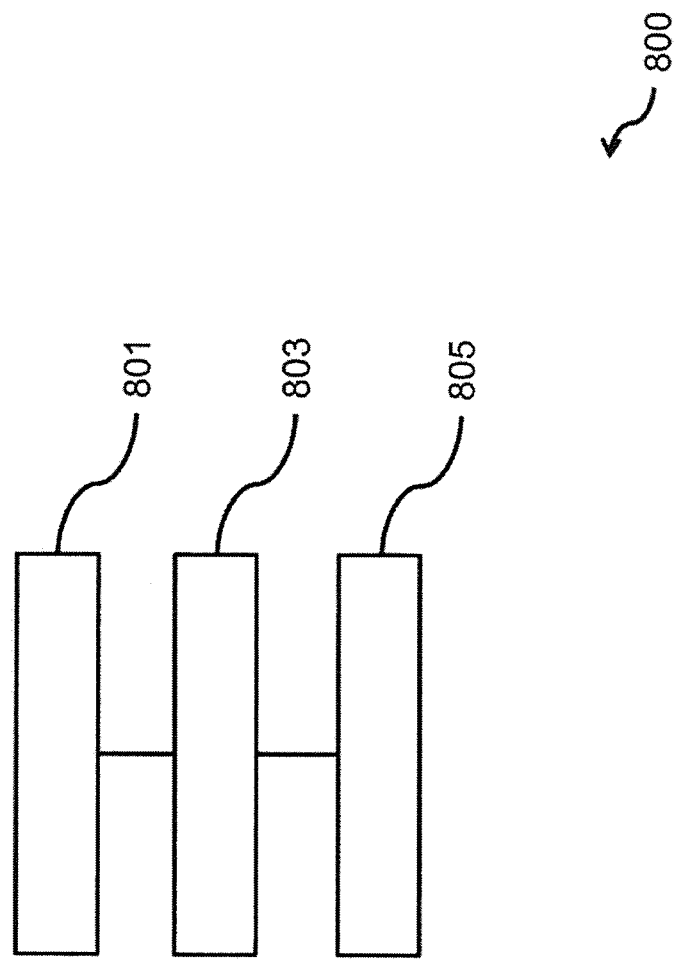
FIG. 8 shows a schematic diagram of a filterbank-based multicarrier transmitting method.

FIG. 8 shows a schematic diagram of a filterbank-based multicarrier transmitting method 800. The filterbank-based multicarrier transmitting method 800 comprises assigning 801 subsequent pilot values, assigning 803 subsequent payload values, and assigning 805 subsequent groups of subsequent pilot values.

The filterbank-based multicarrier transmitting method 800 can be configured to transmit a multicarrier signal, the multicarrier signal comprising a synchronization part and a payload part, the synchronization part comprising K1 frequency sub-channels, the payload part comprising K2 frequency sub-channels, the K1 frequency sub-channels of the synchronization part being arranged to form M subsequent multicarrier symbols.

The filterbank-based multicarrier transmitting method 800 can comprise assigning 801 subsequent pilot values of a pilot sequence to every $P^{th}$ frequency sub-channel of the K1 frequency sub-channels of the synchronization part to obtain a pilot symbol of the multicarrier signal, wherein P is greater than 1, assigning 803 subsequent payload values of a payload sequence to subsequent frequency sub-channels of the K2 frequency sub-channels of the payload part to obtain a payload symbol of the multicarrier signal, and assigning 805 subsequent groups of subsequent pilot values to every $Q^{th}$ symbol of the M multicarrier symbols, wherein Q is equal to or greater than 1.

The filterbank-based multicarrier transmitting method 800 can be performed by a programmably arranged communication device and/or a computer program.

Figure 9:
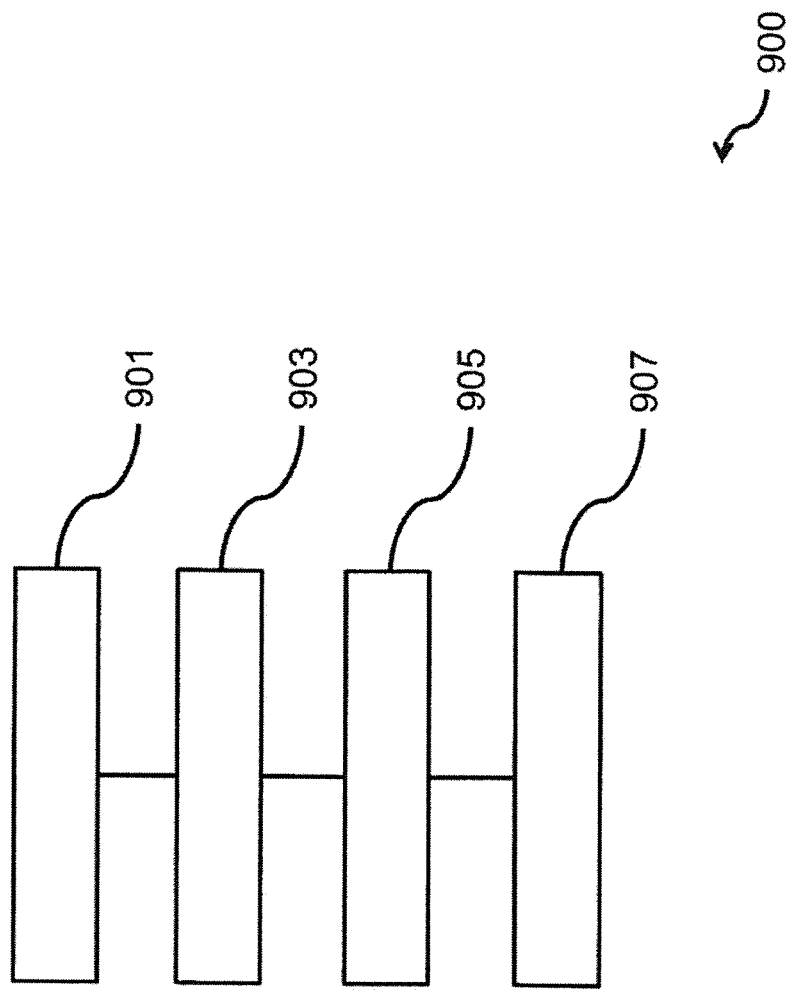
FIG. 9 shows a schematic diagram of a filterbank-based multicarrier receiving method.

FIG. 9 shows a schematic diagram of a filterbank-based multicarrier receiving method 900. The filterbank-based multicarrier receiving method 900 comprises determining 901 an initial symbol timing offset, extracting 903 the pilot symbols of the multicarrier signal, determining 905 a carrier frequency offset, and correcting 907 the multicarrier signal.

The filterbank-based multicarrier receiving method 900 can be configured to receive a multicarrier signal, the received multicarrier signal comprising a synchronization part and a payload part, the synchronization part comprising K1 frequency sub-channels, the payload part comprising K2 frequency sub-channels, the K1 frequency sub-channels of the synchronization part being arranged to form M subsequent received multicarrier symbols, wherein subsequent pilot values of a pilot sequence are assigned to every $P^{th}$ frequency sub-channel of the K1 frequency sub-channels of the synchronization part to obtain a pilot symbol of the multicarrier signal, and wherein subsequent payload values of a payload sequence are assigned to subsequent frequency sub-channels of the K2 frequency sub-channels of the payload part to obtain a payload symbol of the multicarrier signal, wherein P is greater than 1, and wherein subsequent groups of subsequent pilot values are assigned to every $Q^{th}$ symbol of the M multicarrier symbols, wherein Q is equal to or greater than 1.

The filterbank-based multicarrier receiving method 900 can comprise determining 901 an initial symbol timing offset of the received M multicarrier symbols upon the basis of a correlation function between the received multicarrier signal and a shifted version of the received multicarrier signal by a value of Q symbols, extracting 903 the pilot symbols of the multicarrier signal upon the basis of the determined initial symbol timing offset, determining 905 a carrier frequency offset of the received K1 and/or K2 frequency sub-channels upon the basis of the extracted pilot symbols of the multicarrier signal, and correcting 907 the multicarrier signal upon the basis of the determined initial symbol timing offset or the determined carrier frequency offset.

The filterbank-based multicarrier receiving method 900 can be performed by a programmably arranged communication device and/or a computer program.

What is claimed is:

1. A filterbank-based multicarrier transmitter for transmitting a multicarrier signal comprising a synchronization part and a payload part, the synchronization part comprising K1 frequency sub-channels and the payload part comprising K2 frequency sub-channels, the K1 frequency sub-channels of the synchronization part being arranged to form M subsequent multicarrier symbols, the filterbank-based multicarrier transmitter comprising:
   a processor configured to:
      assign subsequent pilot values of a pilot sequence to every $P^{th}$ frequency sub-channel of the K1 frequency sub-channels of the synchronization part to obtain a pilot symbol of the multicarrier signal;
      assign subsequent payload values of a payload sequence to subsequent frequency sub-channels of the K2 frequency sub-channels of the payload part to obtain a payload symbol of the multicarrier signal, wherein P is greater than 1; and
      assign subsequent groups of subsequent pilot values to every $Q^{th}$ symbol of the M multicarrier symbols, wherein Q is equal to or greater than 1.

2. The filterbank-based multicarrier transmitter according to claim 1, wherein the processor is further configured to assign a group of auxiliary pilot values of an auxiliary pilot sequence to at least one $(Q+2)^{th}$ symbol of the M multicarrier symbols.

3. The filterbank-based multicarrier transmitter according to claim 1, wherein the processor is further configured to assign zero values to non-assigned multicarrier symbols or frequency sub-channels.

4. The filterbank-based multicarrier transmitter according to claim 1, wherein the synchronization part is arranged to precede the payload part, and the synchronization part is a preamble of the multicarrier signal.

5. The filterbank-based multicarrier transmitter according to claim 1, wherein the synchronization part is arranged between two payload parts, and the synchronization part is a midamble of the multicarrier signal.

6. The filterbank-based multicarrier transmitter according to claim 1, further comprising:
   a communication interface being configured to transmit the multicarrier signal.

7. A filterbank-based multicarrier receiver for receiving a multicarrier signal comprising a synchronization part and a payload part, the synchronization part comprising K1 frequency sub-channels and the payload part comprising K2 frequency sub-channels, the K1 frequency sub-channels of the synchronization part being arranged to form M subsequent received multicarrier symbols, wherein subsequent pilot values of a pilot sequence are assigned to every $P^{th}$ frequency sub-channel of the K1 frequency sub-channels of the synchronization part to obtain a pilot symbol of the multicarrier signal, and wherein subsequent payload values of a payload sequence are assigned to subsequent frequency sub-channels of the K2 frequency sub-channels of the payload part to obtain a payload symbol of the multicarrier signal, wherein P is greater than 1, and wherein subsequent groups of subsequent pilot values are assigned to every $Q^{th}$ symbol of the M multicarrier symbols, wherein Q is equal to or greater than 1, the filterbank-based multicarrier receiver comprising:
   a processor being configured to:
      determine an initial symbol timing offset of the received M multicarrier symbols upon the basis of a correlation function between the received multicarrier signal and a shifted version of the received multicarrier signal by a value of Q symbols;
      extract the pilot symbols of the multicarrier signal upon the basis of the determined initial symbol timing offset;
      determine a carrier frequency offset of the received K1 or K2 frequency sub-channels upon the basis of the extracted pilot symbols of the multicarrier signal; and
      correct the multicarrier signal upon the basis of the determined initial symbol timing offset or the determined carrier frequency offset.

8. The filterbank-based multicarrier receiver according to claim 7, wherein the processor is configured to shift the multicarrier signal in time or in frequency in order to correct the multicarrier signal.

9. The filterbank-based multicarrier receiver according to claim 7, wherein the processor is further configured to:
   determine a fractional symbol timing offset of the received M multicarrier symbols upon the basis of a correlation function between the corrected multicarrier signal and a reference synchronization part of the multicarrier signal;
   correct the corrected multicarrier signal upon the basis of the determined fractional symbol timing offset for obtaining a re-corrected multicarrier signal;
   extract the pilot symbols of the re-corrected multicarrier signal, to determine a residual carrier frequency offset of the received K1 or K2 frequency sub-channels upon the basis of the extracted pilot symbols of the re-corrected multicarrier signal; and
   correct the re-corrected multicarrier signal upon the basis of the determined residual carrier frequency offset.

10. The filterbank-based multicarrier receiver according to claim 7, wherein the processor is further configured to determine a channel transfer function value upon the basis of the extracted pilot symbols of the re-corrected multicarrier signal and reference pilot symbols of the multicarrier signal.

11. The filterbank-based multicarrier receiver according to claim 7, further comprising:
    a communication interface being configured to receive the multicarrier signal.

12. A filterbank-based multicarrier communication system, comprising:
    a filterbank-based multicarrier transmitter for transmitting a multicarrier signal and a filterbank-based multicarrier receiver for receiving the multicarrier signal, the multicarrier signal comprising a synchronization part and a payload part, the synchronization part comprising K1 frequency sub-channels and the payload part comprising K2 frequency sub-channels, the K1 frequency sub-channels of the synchronization part being arranged to form M subsequent multicarrier symbols;
    wherein the filterbank-based multicarrier transmitter comprises a first processor configured to:
       assign subsequent pilot values of a pilot sequence to every $P^{th}$ frequency sub-channel of the K1 frequency sub-channels of the synchronization part to obtain a pilot symbol of the multicarrier signal,
       assign subsequent payload values of a payload sequence to subsequent frequency sub-channels of the K2 frequency sub-channels of the payload part to obtain a payload symbol of the multicarrier signal, wherein P is greater than 1, and assign subsequent groups of subsequent pilot values to every $Q^{th}$ symbol of the M multicarrier symbols, wherein Q is equal to or greater than 1; and wherein the filterbank-based multicarrier receiver comprises a second processor configured to:

determine an initial symbol timing offset of the received M multicarrier symbols upon the basis of a correlation function between the received multicarrier signal and a shifted version of the received multicarrier signal by a value of Q symbols, extract the pilot symbols of the multicarrier signal upon the basis of the determined initial symbol timing offset, determine a carrier frequency offset of the received K1 or K2 frequency sub-channels upon the basis of the extracted pilot symbols of the multicarrier signal, and correct the multicarrier signal upon the basis of the determined initial symbol timing offset or the determined carrier frequency offset.

13. A filterbank-based multicarrier transmitting method for transmitting a multicarrier signal, the multicarrier signal comprising a synchronization part and a payload part, the synchronization part comprising K1 frequency sub-channels, the payload part comprising K2 frequency sub-channels, the K1 frequency sub-channels of the synchronization part being arranged to form M subsequent multicarrier symbols, the method comprising:

assigning subsequent pilot values of a pilot sequence to every $P^{th}$ frequency sub-channel of the K1 frequency sub-channels of the synchronization part to obtain a pilot symbol of the multicarrier signal, wherein P is greater than 1;

assigning subsequent payload values of a payload sequence to subsequent frequency sub-channels of the K2 frequency sub-channels of the payload part to obtain a payload symbol of the multicarrier signal; and assigning subsequent groups of subsequent pilot values to every $Q^{th}$ symbol of the M multicarrier symbols, wherein Q is equal to or greater than 1.

14. A filterbank-based multicarrier receiving method for receiving a multicarrier signal, the multicarrier signal comprising a synchronization part and a payload part, the synchronization part comprising K1 frequency sub-channels, the payload part comprising K2 frequency sub-channels, the K1 frequency sub-channels of the synchronization part being arranged to form M subsequent received multicarrier symbols, wherein subsequent pilot values of a pilot sequence are assigned to every $P^{th}$ frequency sub-channel of the K1 frequency sub-channels of the synchronization part to obtain a pilot symbol of the multicarrier signal, and wherein subsequent payload values of a payload sequence are assigned to subsequent frequency sub-channels of the K2 frequency sub-channels of the payload part to obtain a payload symbol of the multicarrier signal, wherein P is greater than 1, and wherein subsequent groups of subsequent pilot values are assigned to every $Q^{th}$ symbol of the M multicarrier symbols, wherein Q is equal to or greater than 1, the method comprising:

determining an initial symbol timing offset of the received M multicarrier symbols upon the basis of a correlation function between the received multicarrier signal and a shifted version of the received multicarrier signal by a value of Q symbols;

extracting the pilot symbols of the multicarrier signal upon the basis of the determined initial symbol timing offset;

determining a carrier frequency offset of the received K1 or K2 frequency sub-channels upon the basis of the extracted pilot symbols of the multicarrier signal; and correcting the multicarrier signal upon the basis of the determined initial symbol timing offset or the determined carrier frequency offset.

* * * * *